United States Patent [19]

Buma et al.

[11] Patent Number: 4,856,798

[45] Date of Patent: Aug. 15, 1989

[54] ELECTRONICALLY CONTROLLED FLUID SUSPENSION SYSTEM

[75] Inventors: Shuuichi Buma; Nobutaka Ohwa, both of Toyota; Osamu Takeda, Susono; Toshio Aburaya, Toyota, all of Japan

[73] Assignee: Toyota Jidosha Kabushiki Kaisha, Aichi, Japan

[21] Appl. No.: 215,872

[22] Filed: Jul. 6, 1988

[30] Foreign Application Priority Data

Jul. 6, 1987 [JP] Japan ............... 62-103540[U]
Jul. 6, 1987 [JP] Japan ............... 62-103541[U]

[51] Int. Cl.$^4$ .................. B60S 9/00; B62D 37/00
[52] U.S. Cl. ..................... 280/6.11; 100/41; 280/DIG. 1; 280/707
[58] Field of Search .............. 280/6 H, 6.11, DIG. 1, 280/707; 100/41

[56] References Cited

U.S. PATENT DOCUMENTS

| | | | |
|---|---|---|---|
| 4,597,584 | 7/1986 | Hanser | 280/DIG. 1 |
| 4,610,462 | 9/1986 | Kumagai et al. | 280/DIG. 1 |
| 4,630,840 | 12/1986 | Masuda et al. | 280/DIG. 1 |
| 4,647,069 | 3/1987 | Lijima | 280/DIG. 1 |
| 4,695,074 | 9/1987 | Kobayashi et al. | 280/DIG. 1 |

FOREIGN PATENT DOCUMENTS 61-57415 3/1986 Japan.
61-64512 4/1986 Japan.
61-110407 5/1986 Japan.

Primary Examiner—Kenneth R. Rice
Attorney, Agent, or Firm—Oliff & Berridge

[57] ABSTRACT

An electronically controlled fluid suspension system detects an average longitudinal or lateral acceleration within a predetermined period, computes an acceleration difference between a maximum average acceleration and a minimum average acceleration. Based on the acceleration difference, an estimated longitudinal or lateral acceleration is computed. In response to the estimated longitudinal or lateral acceleration, computed are a height-raising quantity of a lowered portion of a vehicle and a height-lowering quantity of a raised portion thereof. The supply and release of a fluid to and from fluid springs is rapidly controlled so that the height-raising quantity of the lowered portion of the vehicle is less than the height-lowering quantity of the raised portion thereof. The electronically controlled fluid suspension system, thus, prevents the vehicle from inclining due to changes in driving status, and enhances a road-adherence ability on an uneven road as well as a steering stability.

14 Claims, 26 Drawing Sheets

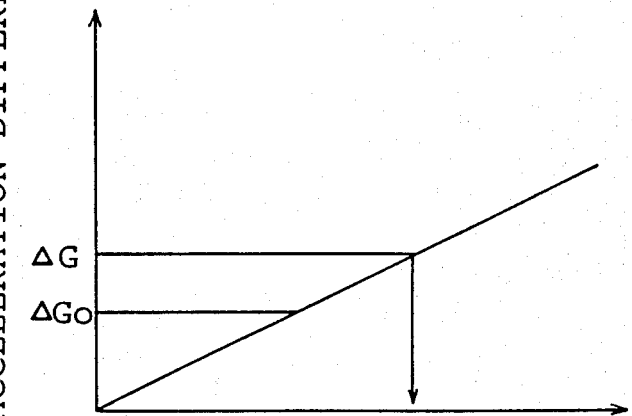
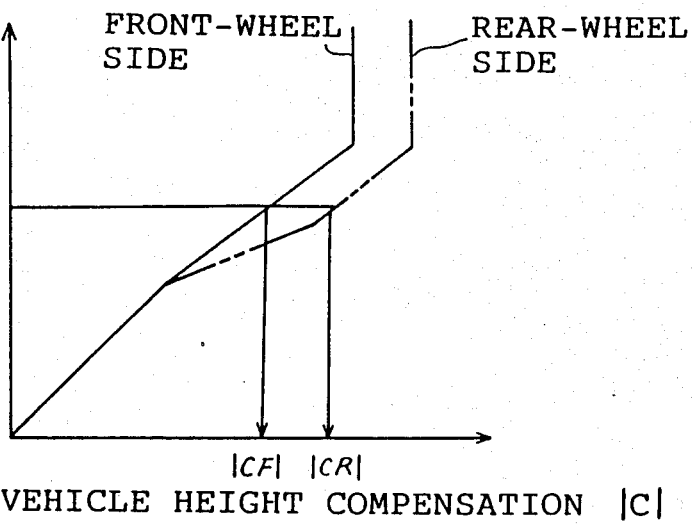

FRONT-WHEEL SIDE HIGH PRESSURE RESERVE TANK

ELECTRONICALLY CONTROLLED FLUID SUSPENSION SYSTEM

BACKGROUND OF THE INVENTION

This invention relates to an electronically controlled fluid suspension system for controlling the attitude of a vehicle.

When a vehicle immediately starts or accelerates, the phenomenon of a squat occurs, that is, the height of the rear end of the vehicle is quickly lowered. Conversely, at the time of sudden braking or stopping, a dive occurs, or specifically, the height of the front end is quickly lowered. The cornering vehicle rolls, that is, the outer-wheel side of the cornering vehicle is lowered. In order to control the inclination of the vehicle caused by such phenomena as squat, dive and roll, various suspension systems have been proposed. For example, in a system disclosed in Japanese published unexamined patent application No. 61-64512, front and rear-wheel side valves are controlled to open during the time period set corresponding to the degree of acceleration, so as to control the vehicle's attitude.

The prior electronically controlled fluid suspension system controls the vehicle's attitude in accordance with the degree of acceleration. Therefore, at the time of rapid acceleration or braking, even large variances in the vehicle's attitude can be controlled and the vehicle's attitude prior to the rapid acceleration can be maintained. However, this prior system cannot improve the road-adherence ability or cannot maintain the steering stability during acceleration, braking or cornering.

It is generally known that the wheels of a vehicle are provided respectively with a fluid spring. By supplying or releasing fluid to or from the fluid spring, the vehicle's attitude is electronically controlled. For example, in a system disclosed in Japanese published unexamined patent application No. 61-57415, when a target vehicle height is changed, the air is supplied to or released from the fluid spring through a piping having a large diameter for a specified time period, and then through a piping having a small diameter. The suspension system adjusts the vehicle height rapidly and prevents overshooting. For another example, Japanese published unexamined patent application No. 61-110407 discloses a suspension system where the fluid supply and release sides of a vehicle are provided respectively with a fluid spring, and a control valve selects the fluid spring to supply or release the air thereto or therefrom. A fluid supply control valve for the front wheels of the vehicle is installed between the control valve and a fluid supply tank for the front wheels. Separately, a fluid supply control valve for the rear wheels of the vehicle is provided between the control valve and a fluid supply tank for the rear wheels thereof. Thereby, a quantity of fluid supplied to the fluid springs of the front and rear wheels can be changed to avoid unbalanced vehicle height due to variances in load conditions on the vehicle.

In the prior art suspension systems, the vehicle's height is changed wheel by wheel sequentially. Problem is that changing the vehicle height of a wheel affects the other wheels, that is, changes the vehicle height thereof. If fluid simultaneously starts to be supplied to or released from each fluid spring of the four wheels, and the fluid supply or release is stopped sequentially from the wheel which reaches the target height, the fluid spring which first terminates the fluid supply or release is influenced by the fluid spring which air is still supplied to or released from. The target vehicle height of the wheel having the influenced fluid spring varies, requiring fluid supply or release again to regain the target vehicle height. Therefore, the control over the vehicle's attitude is a time consuming work.

SUMMARY OF THE INVENTION

It is accordingly an object of the present invention to provide an electronically controlled fluid suspension system for enhancing the road-adherence ability according to variable acceleration, etc. and improving the steering stability during acceleration, braking or cornering.

Another object of the present invention is to provide an electronically controlled fluid suspension system for reducing a time period required for controlling the vehicle's attitude.

With reference to FIG. 1, these objects are attained by a fluid suspension system for a vehicle comprising: a fluid suspension having a fluid actuator M1; fluid supply/release means M2 for supplying and releasing working fluid to and from the fluid actuator M1; inclination detection means M3 for detecting an inclination of the vehicle; and inclination control means M4 responsive to the inclination detection means M3 for controlling the supply/release means M2 such that a height-raising quantity for a lowered portion of the vehicle is less than a height-lowering quantity for a raised portion of the vehicle.

BRIEF DESCRIPTION OF THE DRAWINGS

The invention may be best understood by reference to the following description of preferred embodiments and the drawings in which:

FIG. 10 is a graph showing a relation between an acceleration difference and an estimated longitudinal acceleration;

FIG. 11 is a graph showing a relation between an estimated longitudinal acceleration and a vehicle height compensation when a dive control is carried out;

DETAILED DESCRIPTION OF PREFERRED EMBODIMENTS

Figure 2:
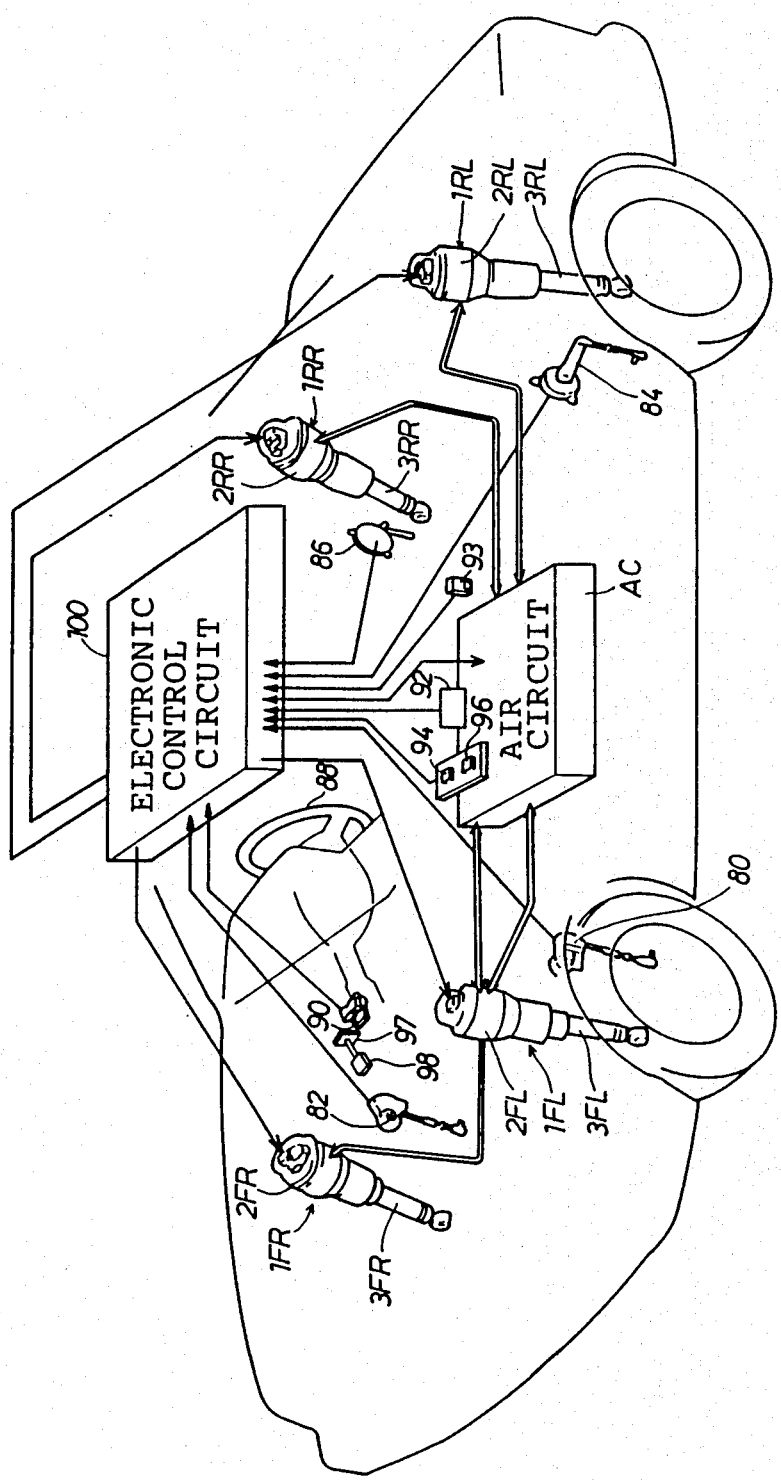
FIG. 2 is a schematic view of an electronically controlled suspension system according to first and second embodiments of the present invention.
Figure 3:
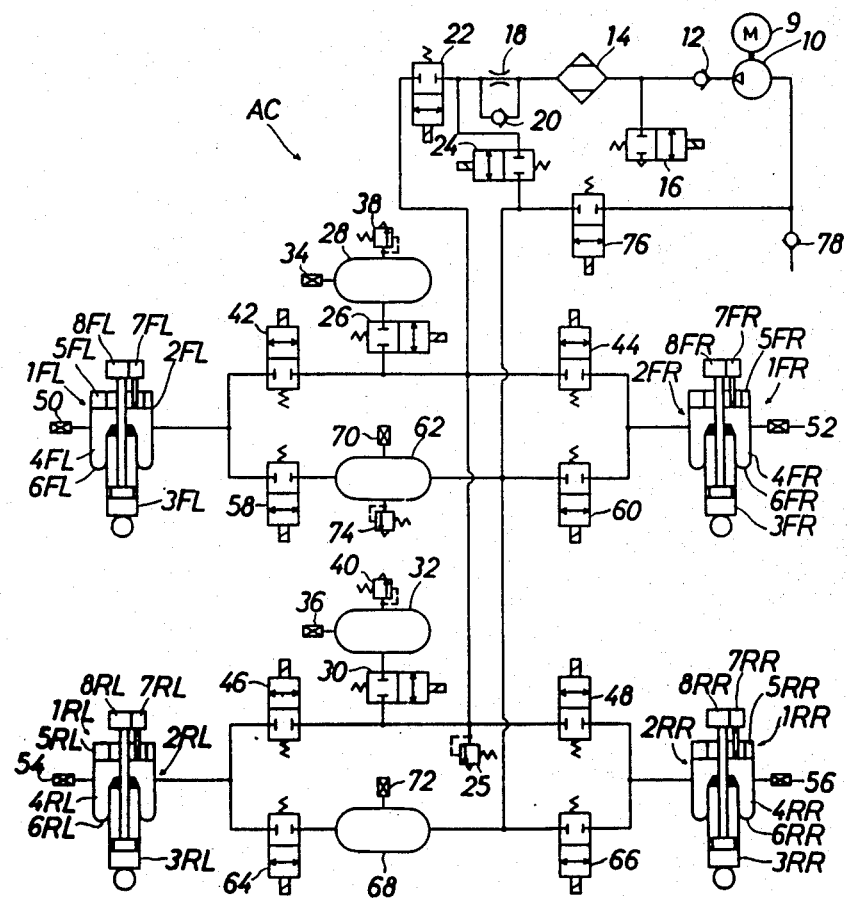
FIG. 3 is an air circuit diagram of the present embodiments.

As shown in FIGS. 2 and 3, the electronically controlled fluid suspension system of the present invention is equipped with a front-wheel left-hand suspension 1FL, a front-wheel right-hand suspension 1FR, a rear-wheel left-hand suspension 1RL and a rear-wheel right-hand suspension 1RR, all of which are connected to an air circuit AC. These suspensions 1FL, 1FR, 1RL and 1RR are equipped with air springs 2FL, 2FR, 2RL and 2RR and shock absorbers 3FL, 3FR, 3RL and 3RR, respectively. The air springs 2FL, 2FR, 2RL and 2RR are equipped with main air chambers 4FL, 4FR, 4RL and 4RR and auxiliary air chambers 5FL, 5FR, 5RL and 5RR, respectively. The main air chambers 4FL, 4FR, 4RL and 4RR are partially formed of diaphragms 6FL, 6FR, 6RL and 6RR so that the height of the vehicle can be changed by supplying and discharging air to and from the main air chambers 4FL, 4FR, 4RL and 4RR. The air springs 2FL, 2FR, 2RL and 2RR can have their spring constants changed to "low", "medium" and "high" steps by energizing spring motors 7FL, 7FR, 7RL and 7RR to either provide/block communications between the main air chambers 4FL, 4FR, 4RL and 4RR and the auxiliary air chambers 5FL, 5FR, 5RL and 5RR or switch the air flow rates. The shock absorbers 3FL, 3FR, 3RL and 3RR can have their damping force changed to "low", "medium" and "high" by energizing absorber motors 8FL, 8FR, 8RL and 8RR to control the flow rate of working oil passing through orifices (not shown).

On the other hand, the air circuit AC is equipped with a compressor 10 which is driven by a motor 9 so that it may act as a compressed air supply source for the air springs 2FL, 2FR, 2RL and 2RR. The compressor 10 has its discharge side connected to an air drier 14 and a main discharge valve 16 through a check valve 12 for preventing any back flow. Silica gel is provided in the air drier 14 to remove moisture from the compressed air. This air drier 14 is connected to the respective one side of a supply valve 22 and a connection valve 24 through a fixed throttle 18 and a check valve 20 for preventing any back flow. The other side of the supply valve 22 is connected to a relief valve 25 set at a predetermined pressure, and through a high pressure reservoir valve 26 to a front-wheel side high pressure reserve tank 28, and through another high pressure reservoir valve 30 to a rear-wheel side high pressure reserve tank 32. These high pressure reserve tanks 28 and 32 are respectively equipped with pressure sensors 34 and 36 for detecting the air pressures in the high pressure reserve tanks 28 and 32 and relief valves 38 and 40 set at a predetermined pressure.

The above-mentioned side of the supply valve 22 is connected through a leveling valve 42 to the main air chamber 4FL, through a leveling valve 44 to the main air chamber 4FR, through a leveling valve 46 to the main air chamber 4RL, and through a leveling valve 48 to the main air chamber 4RR. To these main air chambers 4FL, 4FR, 4RL and 4RR, respectively, there are connected pressure sensors 50, 52, 54 and 56 for detecting the air pressures.

The main air chamber 4FL at the front-wheel left-hand side and the main air chamber 4FR at the front-wheel right-hand side are connected to a low pressure reserve tank 62 at the front wheel side, respectively, through a discharge valve 58 and a similar discharge valve 60. Moreover, the main air chamber 4RL at the rear-wheel left-hand side and the main air chamber 4RR at the rear-wheel right-hand side are connected to a low pressure reserve tank 68 at the rear wheel side, respectively, through a discharge valve 64 and a similar discharge valve 66. On the other hand, the front-wheel side low pressure reserve tank 62 and the rear-wheel side low pressure reserve tank 68 are connected to have communication at all times. To these low pressure reserve tanks 62 and 68, respectively, there are connected pressure sensors 70 and 72 for detecting the air pressures in the reserve tanks 62 and 68. To the front-wheel side low pressure reserve tank 62, there is connected a relief valve 74 which is set at a predetermined pressure.

These two low pressure reserve tanks 62 and 68 are connected to the other side of the aforementioned connection valve 24 and further to the suction side of the compressor 10 through a suction valve 76. To the suction side of the compressor 10, there is connected a check valve 78 for intaking external air. It may be possible to construct the air circuit AC as a closed circuit without the check valve 78 and to fill the air circuit AC with air or other gas, e.g., nitrogen gas.

The aforementioned discharge valve 16, supply valve 22, connection valve 24, high pressure reservoir valves 26 and 30, leveling valves 42, 44, 46 and 48, discharge valves 58, 60, 64 and 66, and suction valve 76 are of the normally closed two-position type in the present embodiments.

The present air circuit AC is equipped at its front wheel side and rear wheel side with the high pressure reserve tanks 28 and 32 and the low pressure reserve tanks 62 and 68. The front wheel side and rear wheel side may be provided in common with a high pressure reserve tank and a low pressure reserve tank.

As shown in FIG. 2, in the suspension system of the present invention, there are provided: a height sensor 80 for detecting the distance between the left-hand front wheel and the vehicle body, i.e., the left-hand front height; a height sensor 82 for detecting the right-hand front height; a height sensor 84 for detecting the left-hand rear height; and a height sensor 86 for detecting the right-hand rear height. Each of these height sensors 80, 82, 84, and 86 outputs a signal corresponding to a positive height difference when the detected height is greater than a predetermined standard height, and outputs a signal corresponding to a negative height difference when the detected height is less than the standard height. There are also provided: a steering angle sensor 90 for detecting the steering angle and direction of a steering wheel 88; an acceleration sensor 92 for detecting the acceleration of the vehicle body; and a speed sensor 93 for detecting the vehicular operating speed based on the revolution speed of the output shaft of the transmission (not shown). Also provided are high and low level switches 94 and 96 which are manually operated to instruct the vehicle height Further provided is a brake switch 98 which detects a brake pedal 97 to be pressed down.

Figure 1:
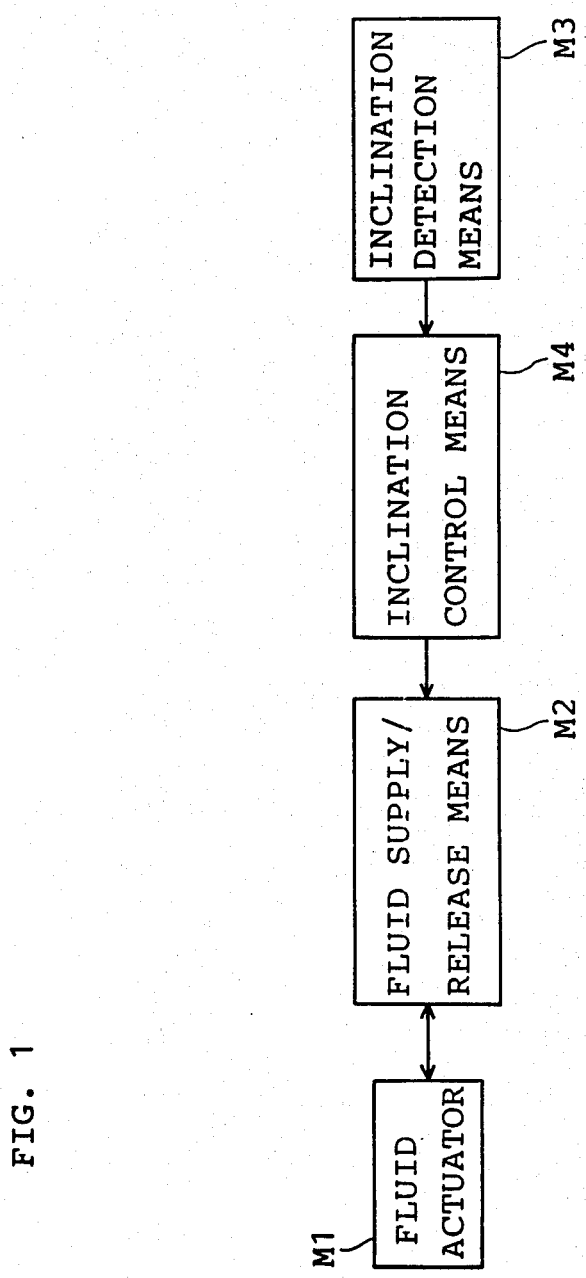
FIG. 1 is a block diagram showing a fundamental structure of a first embodiment of the present invention.

With reference to FIG. 1, the aforementioned air circuit AC constitutes fluid supply/release means M4.

Figure 4:
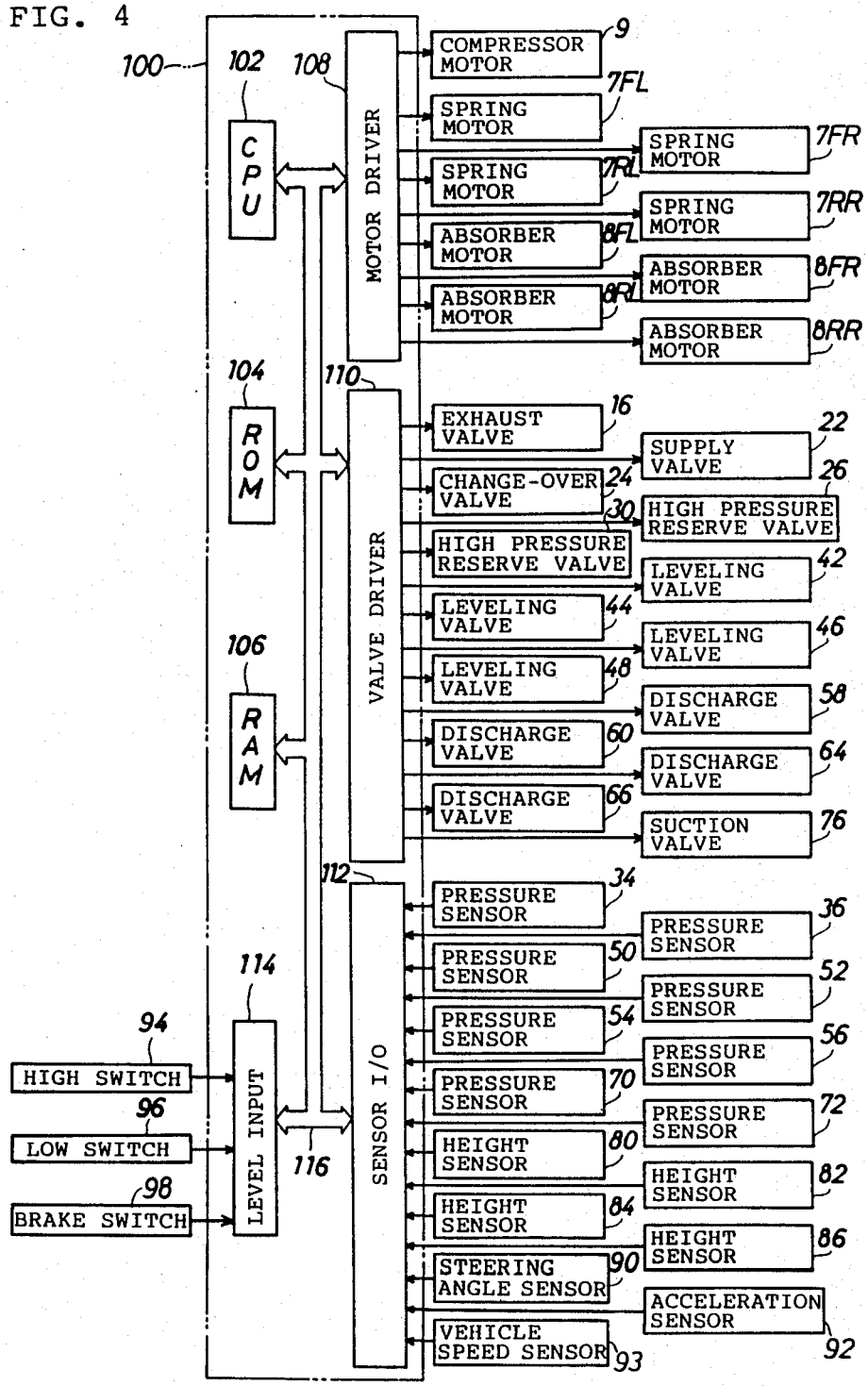
FIG. 4 is a block diagram indicating the construction of an electric system according to the present embodiments.
Figure 5A:
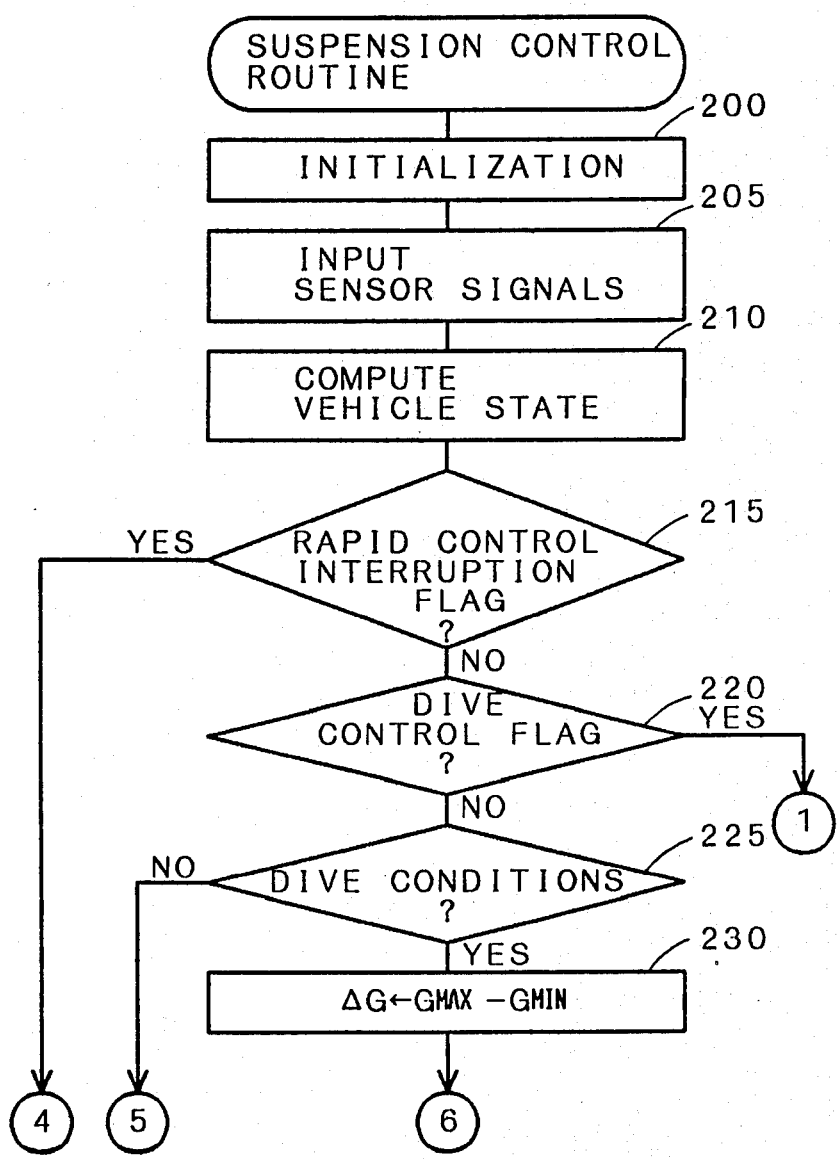
FIGS. 5A, 5B, 6, 7A, 7B and 8 indicate a flowchart of a suspension control routine of the first embodiment.
Figure 5B:
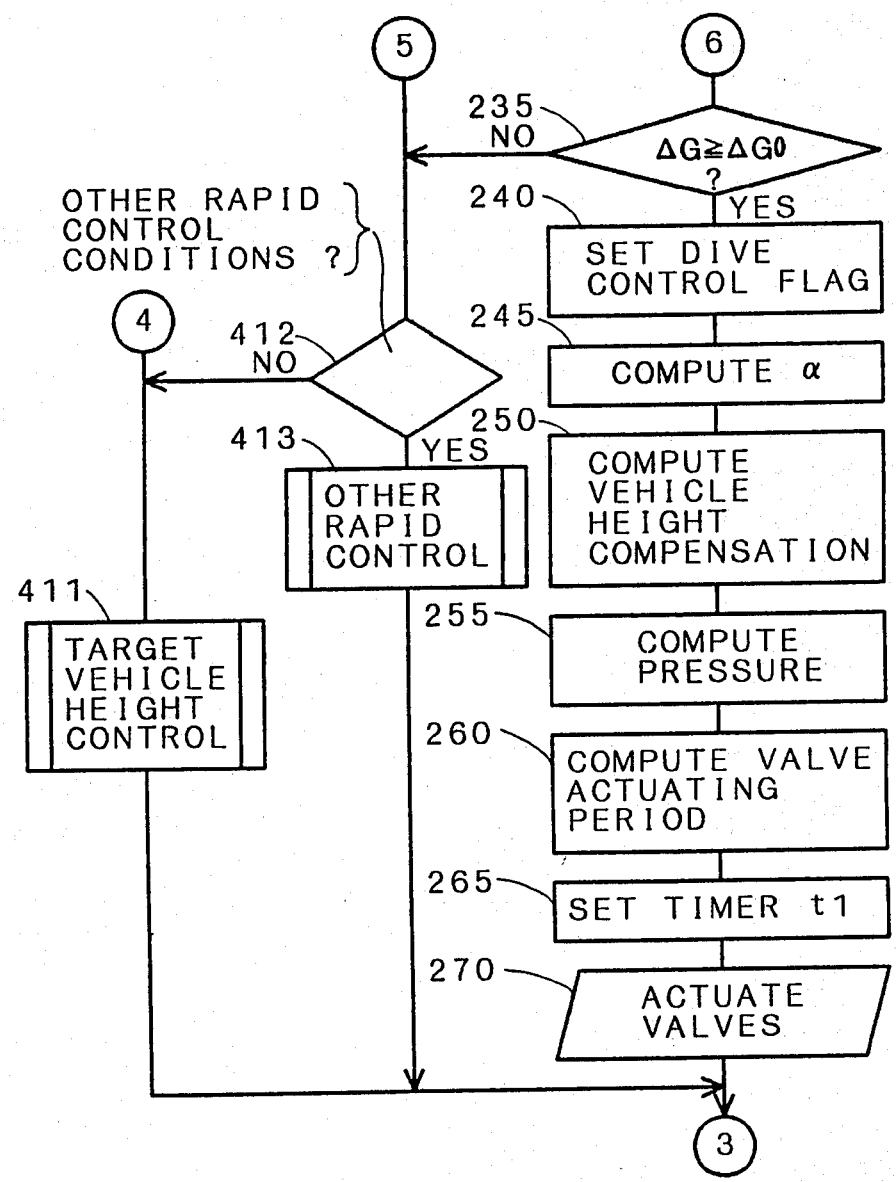
Figure 6:
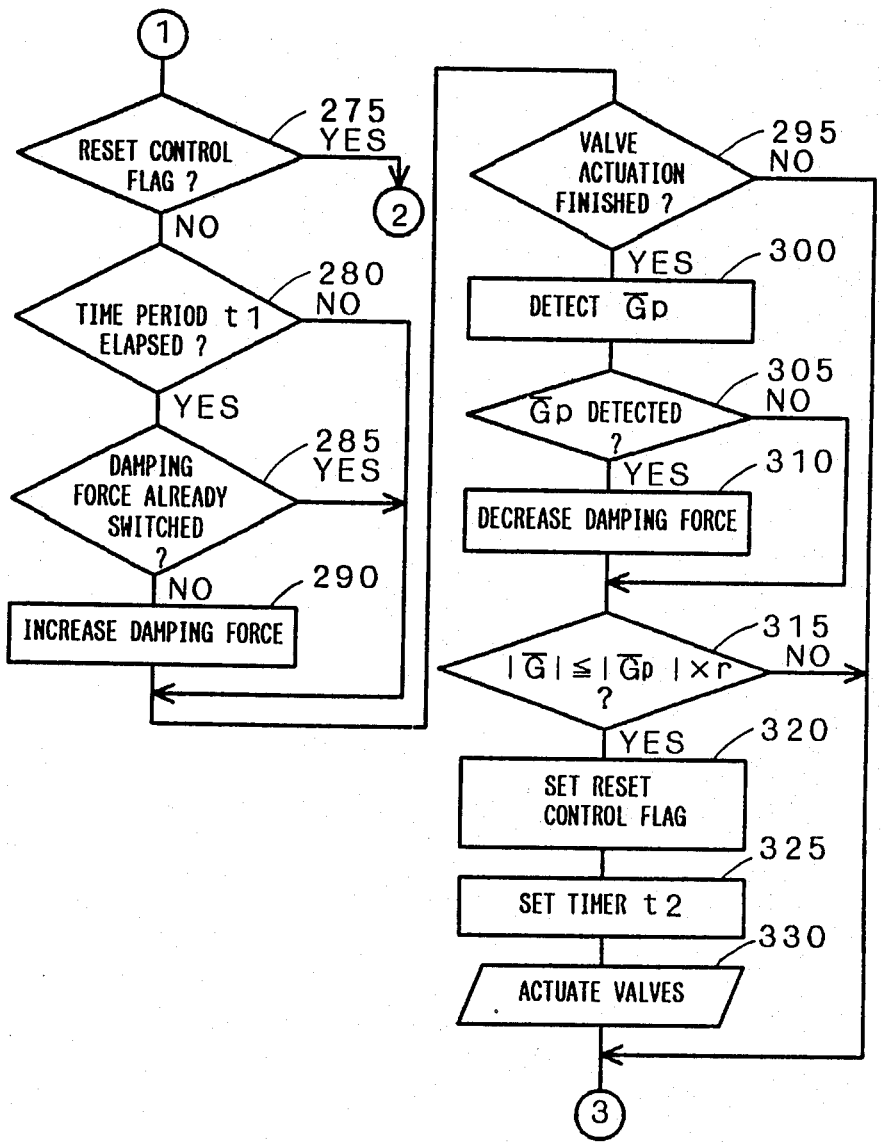
Figure 7A:
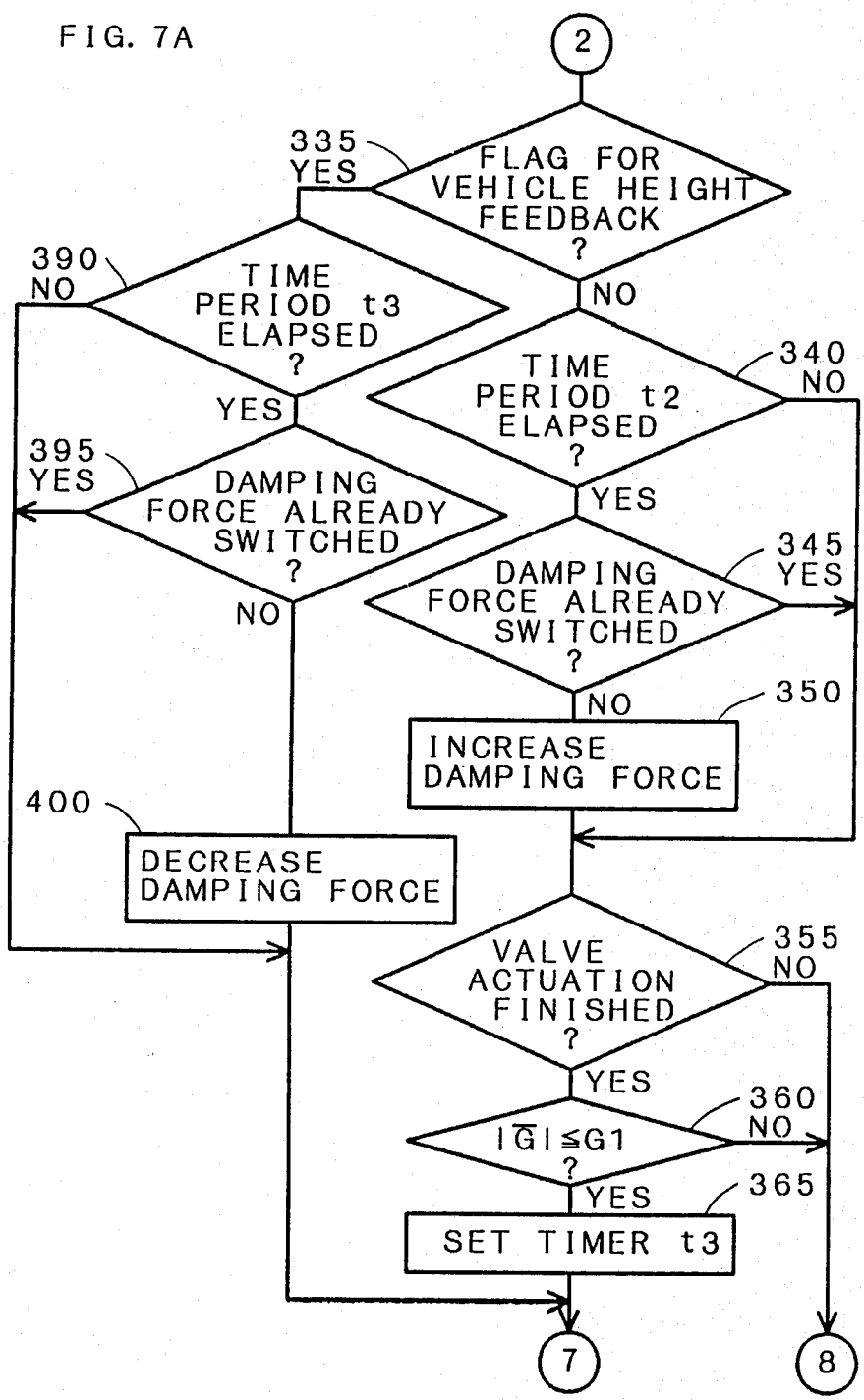
Figure 7B:
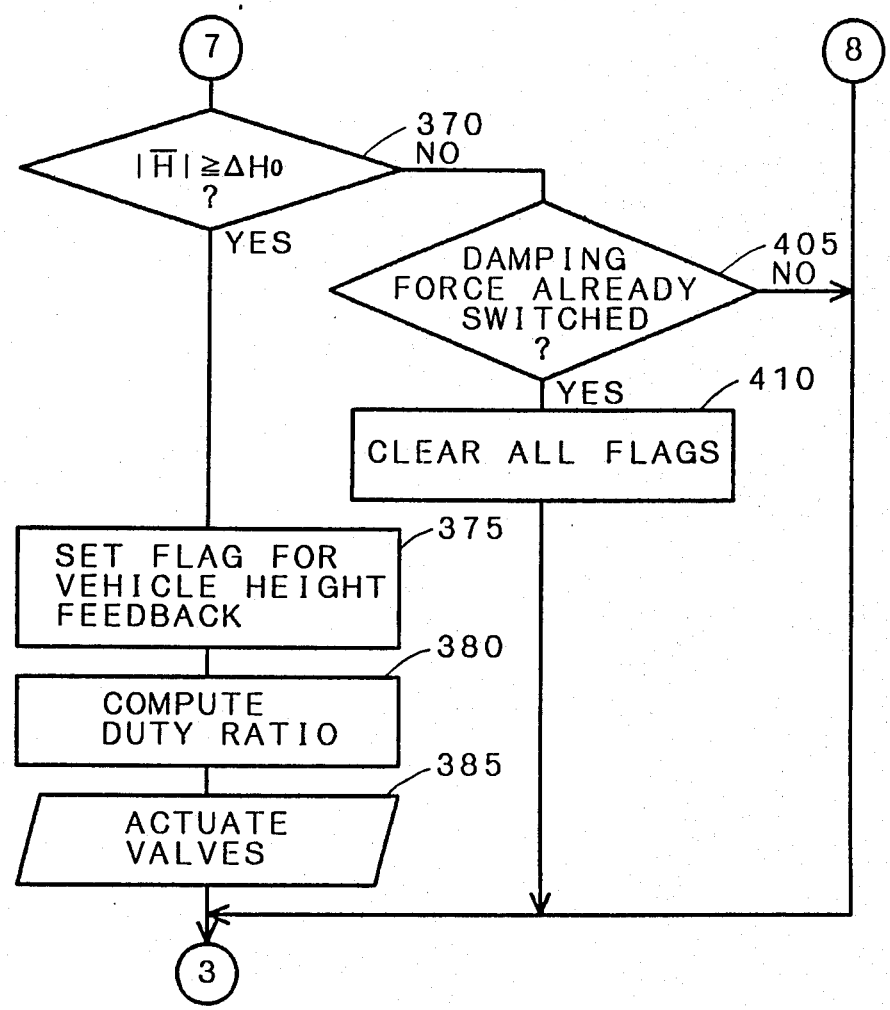

The electrical system of the present invention will be described with reference to the block diagram shown in FIG. 4. The aforementioned individual air suspensions 1FL, 1FR, 1RL and 1RR are driven and controlled by an electronic control circuit 100 to control the attitude of the vehicle. This electronic control circuit 100 includes, as shown in FIG. 4, known CPU 102, ROM 104 and RAM 106, as its logical arithmetic circuit. These CPU 102, ROM 104 and RAM 106 are mutually connected with input/output circuits, such as a motor driver 108, a valve driver 110, a sensor input circuit 112 and a level input circuit 114 by way of a common bus 116.

The CPU 102 receives the signals of the pressure sensors 34, 36, 50, 52, 54, 56, 70 and 72, the height sensors 80, 82, 84 and 86, the steering angle sensor 90, the acceleration sensor 92 and the speed sensor 93 by way of the sensor input circuit 112, and receives the signals of the high and low level switches 94, 96 and the brake switch 98 by way of the level input circuit 114. In response to these signals and the data in the ROM 104 and the RAM 106, on the other hand, the CPU 102 controls the individual air suspensions 1FL, 1FR, 1RL and 1RR by outputting drive signals to the compressor motor 9, the spring motors 7FL, 7FR, 7RL and 7RR and the absorber motors 8FL, 8FR, 8RL and 8RR through the motor driver 108 and by outputting drive signals to the discharge valve 16, the supply valve 22, the connection valve 24, the high pressure reservoir valves 26 and 30, the leveling valves 42, 44, 46 and 48, the discharge valves 58, 60, 64 and 66 and the suction valve 76 through the valve driver 110.

Figure 14:
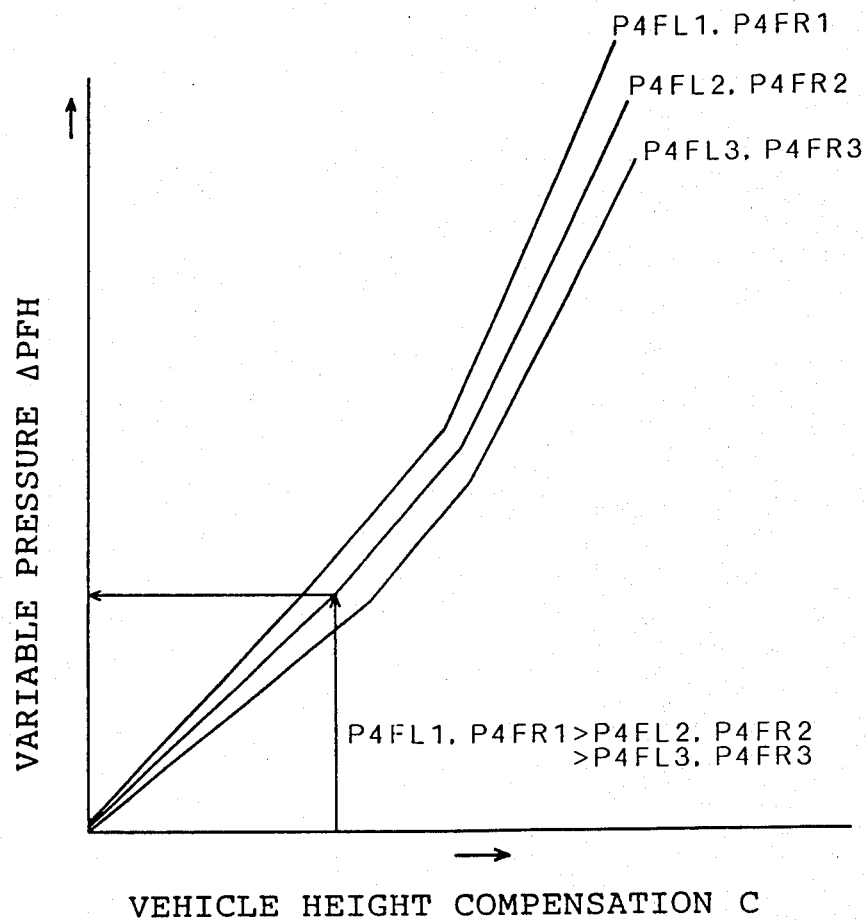
FIG. 14 is a graph showing a relation between a variable pressure and a vehicle height compensation.

The ROM 104 stores various maps, namely: MAP-a corresponding to a graph shown in FIG. 10; MAP-b corresponding to FIG. 11; MAP-c corresponding to FIG. 14; MAP-d corresponding to FIG. 15; MAP-e corresponding to FIG. 16; MAP-f corresponding to FIG. 17; and MAP-g corresponding to FIG. 18. Specifically, FIG. 10 for MAP-a shows an acceleration difference $\Delta G$ (explained later) on the ordinate axis; and an estimated longitudinal acceleration $\alpha$ (explained later) on the abscissa axis. FIG. 11 for MAP-b shows an estimated longitudinal acceleration $\alpha$ (explained later) on the ordinate axis; and an absolute value of vehicle height compensation C on the abscissa axis which increases with the estimated longitudinal acceleration $\alpha$.

Figure 12:
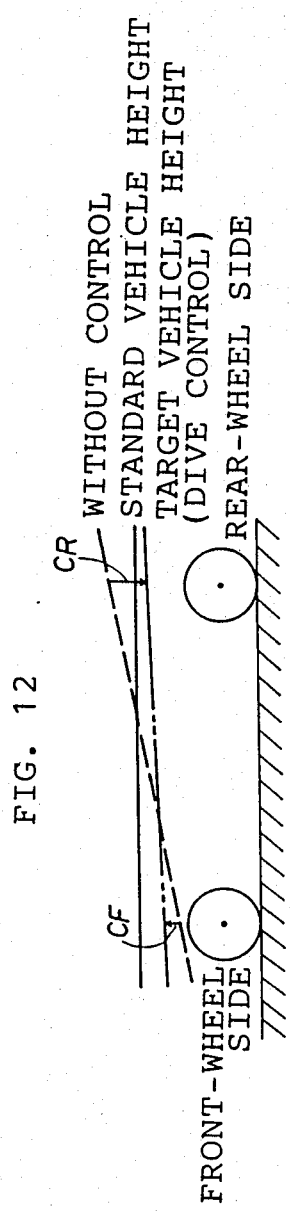
FIG. 12 is an illustration showing a comparison between a standard vehicle height and a target height under a dive control.
Figure 13:
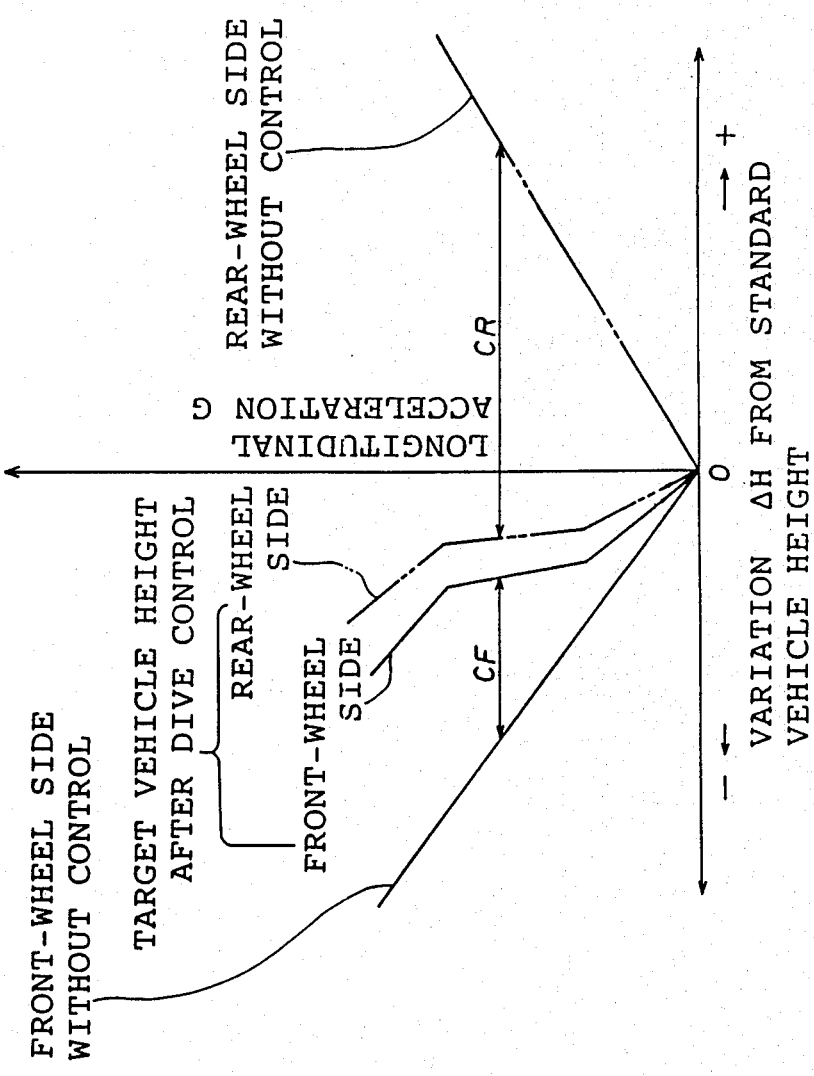
FIG. 13 is a graph showing a relation between a longitudinal acceleration and a variation from standard vehicle height during a dive control.

In FIG. 12, a target vehicle height (interrupted line) under a dive control is determined to be lower than a standard vehicle height (continuous line) both at the front and rear-wheel sides. The target vehicle height at the front-wheel side is controlled to be lower than that at the rear-wheel side. Differences CF at the front-wheel side and CR at the rear-wheel side between the target height (interrupted line) and the vehicle height without control (broken line) are obtained as controlled variables. The controlled variables CF and CR are derived based on the longitudinal acceleration G according to FIG. 13, which shows the longitudinal acceleration G on the ordinate axis and a variation $\Delta H$ from standard vehicle height on the abscissa axis. In FIG. 13 shown are the front and rear-wheel side vehicle heights without dive control and target vehicle heights after dive control corresponding to longitudinal acceleration G. According to the longitudinal acceleration G, FIG. 13 determines the controlled variables, i.e., the differences CF at the front-wheel side and CR at the rear-wheel side between the target vehicle height and the height without dive control. The differences CF at the front-wheel side and CR at the rear wheel side draw the graph in FIG. 11, where a front-wheel side vehicle height compensation CF, i.e., a raising quantity of the lowered front-wheel side is set smaller than a rear-wheel side vehicle height compensation CR, i.e., a lowering quantity of the raised rear-wheel side.

Figure 15:
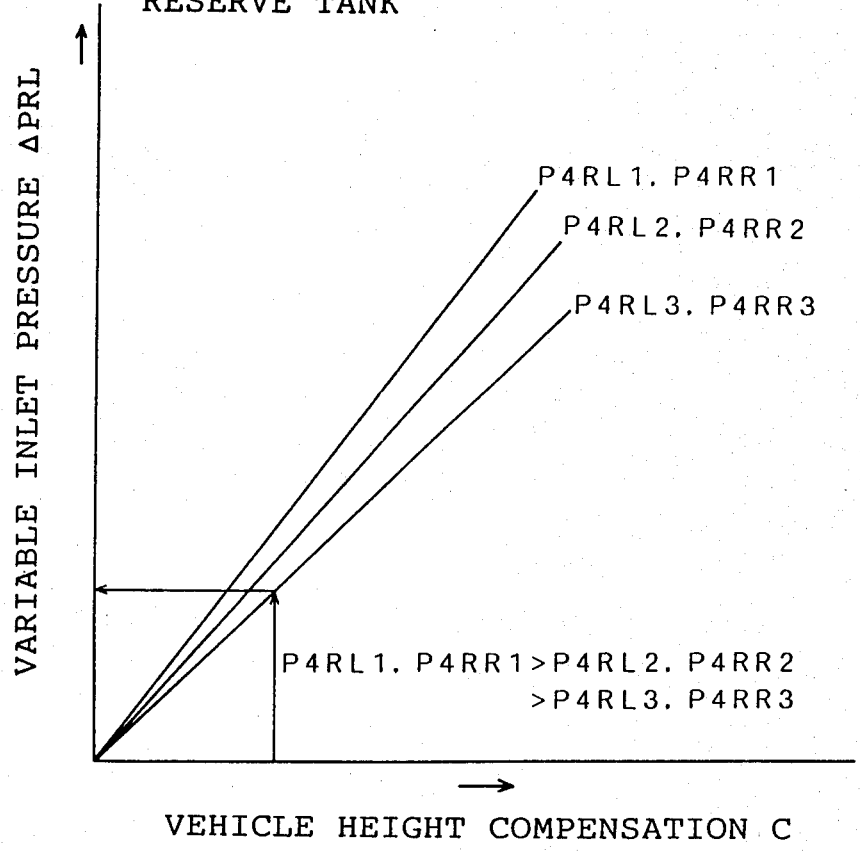
FIG. 15 is a graph showing a relation between a variable pressure and a vehicle height compensation.
Figure 16:
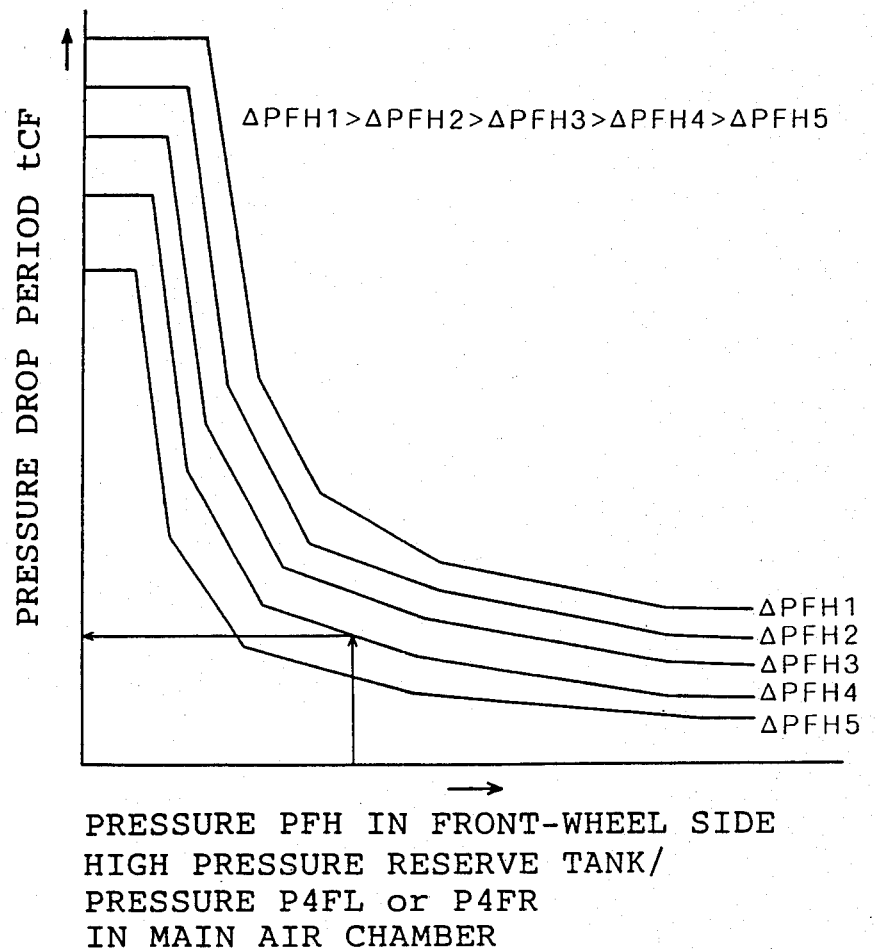
FIG. 16 is a graph showing a relation between a pressure drop period and a ratio of a pressure in high pressure reserve tanks to a pressure in main chambers.
Figure 17:
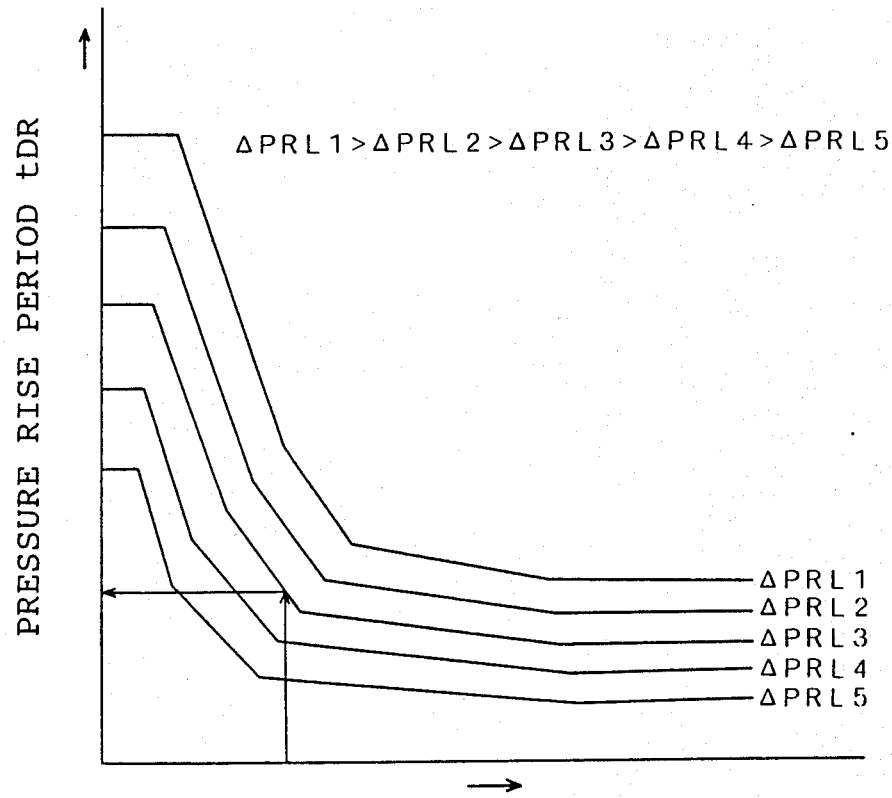
FIG. 17 is a graph showing a relation between a pressure rise period and a ratio of a pressure in main chambers to a pressure in low pressure reserve tanks.
Figure 18:
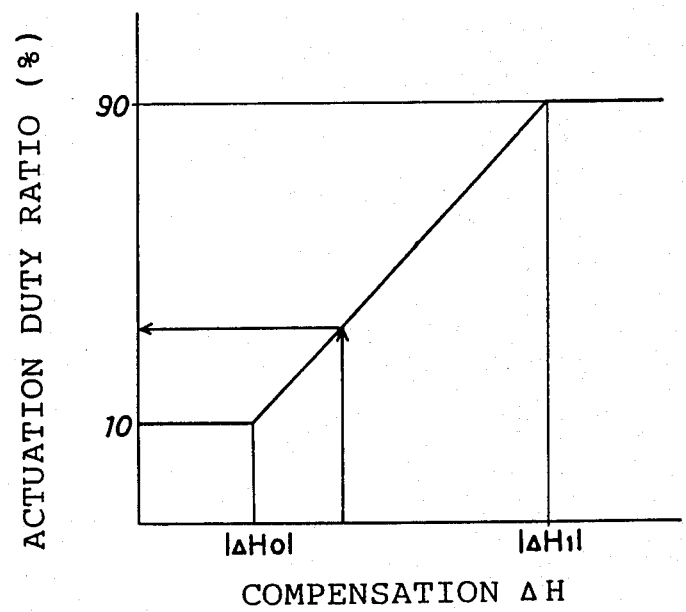
FIG. 18 is a graph showing an actuation duty ratio and a compensation.

Fig, 14 for MAP-c shows a variable pressure $\Delta PFH$ on the ordinate axis; and a vehicle height compensation C at the front-wheel side on the abscissa axis, with pressure P4FL or P4FR in the front-wheel side main air chamber 4FL or 4FR as a parameter. The pressures P4FL and P4FR change according to the load condition on the vehicle, and the variable pressure $\Delta PFH$ changes as the air flows out of the front-wheel side high pressure reserve tank 28 into the front-wheel side main air chambers 4FL and 4FR. FIG. 15 for MAP-d shows a variable pressure $\Delta PRL$ on the axis of ordinate; and a vehicle height compensation C at the rear-wheel side on the axis of abscissa, with pressure P4RL or P4RR in the rear-wheel side main air chamber 4RL or 4RR as a parameter. The variable pressure $\Delta PRL$ changes as the air flows into the rear-wheel side low pressure reserve tank 68 from the rear-wheel side main air chambers 4RL and 4RR. FIG. 16 for MAP-e shows a pressure drop time period tCF on the ordinate axis; and a ratio of the pressure PFH in the front-wheel side high pressure reserve tank to the pressure P4FL or P4FR in the main air chambers on the abscissa axis, with the variable pressure PFH in the front-wheel side high pressure reserve tank as a parameter. The aforementioned pressure drop time period tCF is a necessary period for stepping down the pressure $\Delta PFH$ in the high pressure reserve tank 28 corresponding to the variable pressure $\Delta PFH$ when the compressed air is supplied into the front-wheel side main air chambers 4FL and 4FR. FIG. 17 for MAP-f shows a pressure rise time period tDR on the ordinate axis; and a ratio of the pressure P4RL or P4RR in the rear-wheel side main air chambers to the pressure PRL in the rear-wheel side low pressure reserve tank on the abscissa axis, with the variable pressure PRL in the rear-wheel side low pressure reserve tank 68 as a parameter. The aforementioned pressure rise time period tDR is a necessary period for stepping up the pressure PRL in the low pressure reserve tank corresponding to the variable pressure $\Delta PRL$ when the air is discharged from the rear-wheel side main air chamber 4RL or 4RR into the low pressure reserve tank 68. FIG. 18 for MAP-g shows a valve actuation duty ratio—explained later—on the ordinate axis and a compensation ΔH on the abscissa axis.

The ROM 104 further stores some other maps, namely: MAP-h, MAP-i, MAP-j, and MAP-k. Similarly to FIG. 14, MAP-h shows a relation between a variable pressure PRH in the rear-wheel side high pressure reserve tank 32 and vehicle height compensation C for the rear-wheel side of the vehicle. Similarly to FIG. 15, MAP-i shows a relation between a variable pressure PFL in the front-wheel side low pressure reserve tank 62 and vehicle height compensation C for the front-wheel side of the vehicle. Similarly to FIG. 16, MAP-j shows a relation between the pressure drop time period tCR of the rear-wheel side high pressure reserve tank 32 and ratio of the pressure P4RL or P4RR in the main air chamber to the pressure PRH in the rear-wheel side high pressure reserve tank 32. Similarly to FIG. 17, MAP-k shows a relation between a pressure rise time period tDF of the front-wheel side low pressure reserve tank 62 and ratio of the pressure PFL in the front-wheel side low pressure reserve tank to the pressure P4FL or P4FR in the main air chamber.

The processing procedures to be executed in the electronic control circuit 100 described above will be explained with reference to the flowchart of FIGS. 5A through 8.

When the key switch (not shown) is turned on, the electronically controlled air suspension system of the present invention executes a suspension control routine shown in FIGS. 5A through 8 as well as other control routines. First, data, flags and so on are initialized at step 200. At step 205, the signals from the pressure sensors 34, 36, 50, 52, 54, 56, 70 and 72, from the height sensors 80, 82, 84 and 86, from the steering angle sensor 90, from the acceleration sensor 92 and the speed sensor 93 are input through the sensor input circuit 112. At step 210, the state of the vehicle is computed based on the signals from the individual sensors. For example, a current longitudinal acceleration G detected by the acceleration sensor 92 is sequentially input at intervals of a predetermined time period, e.g., 8 msec, and then an average longitudinal acceleration Gn is computed based on the sum of longitudinal accelerations G detected within a predetermined time period, e.g., 32 msec, according to the following equation (1):

$$\overline{Gn} = \sum_{m=1}^{4} Gm/4 \quad (1)$$

Similarly, a current lateral acceleration Gan detected by the acceleration sensor 92 is sequentially input at intervals of a predetermined time period, e.g., 8 msec, and then an average lateral acceleration $\overline{Gan}$ is computed based on the sum of lateral accelerations Gan detected within a predetermined time, e.g., 64 msec. A current vehicle height Hn detected by the height sensors 80, 82, 84 and 86 is sequentially input at intervals of a predetermined time period, e.g., 8 msec, and then an average height $\overline{Hn}$ is computed based on the sum of the vehicle heights Hn detected within a predetermined time period, e.g., 32 msec.

After step 210 it is determined at step 215 whether or not a rapid control interruption flag (described later) is being set. If NO, it is determined at step 220 whether or not a dive control flag (described later) is being set. If NO, at step 225 it is determined whether or not there exist dive conditions: the current vehicle speed V, detected at step 210 is more than a predetermined speed Va, e.g., 25 km/h; an absolute value of the current lateral acceleration Ga is less than a predetermined acceleration Gao, e.g., 0.3 g (g=gravitational acceleration); the brake pedal 97 is pressed down, turning on the brake switch 98; an absolute value of the steering angle θ of the steering wheel 88, detected by the steering angle sensor 90 is smaller than a predetermined angle θo, e.g., 45 degrees; and an absolute value of the steering speed $\dot{\theta}$ is less than the predetermined steering speed $\dot{\theta}$o, e.g., 140 degrees/sec. Immediately after it is thus judged there are dive conditions at step 225, an acceleration difference ΔG is computed at step 230. More specifically, at step 230, the acceleration difference ΔG is calculated in the following method. As shown in FIG. 9, a maximum average longitudinal acceleration $\overline{G}$MAX, e.g., $\overline{G}$3 and a minimum average longitudinal acceleration $\overline{G}$MIN, e.g., $\overline{G}$1 are obtained among $\overline{G}$1, $\overline{G}$2 and $\overline{G}$3 which are detected at step 210 at particular intervals ta, e.g., 32 msec by the acceleration sensor 92 within a predetermined period tb, e.g., 96 msec immediately after the detection of dive conditions at step 225. The difference of these maximum $\overline{G}$MAX and minimum $\overline{G}$MIN becomes the acceleration difference G (=$\overline{G}$MAX-$\overline{G}$MIN).

At step 235 if the acceleration difference ΔG is equal to or more than a specified acceleration difference ΔGo, e.g., 0.096 g, then the dive control flag is set at step 240. Thereafter, based on the acceleration difference ΔG computed at step 230, step 245 computes an estimated longitudinal acceleration α according to the graph MAP-a shown in FIG. 10. Based on the estimated longitudinal acceleration α, at step 250, vehicle height compensation CF at the front-wheel side and CR at the rear-wheel side are computed according to the graph or MAP-b shown in FIG. 11.

At step 255, based on the computed vehicle height compensation CF at the front-wheel side, the variable pressure ΔPFH in the high pressure reserve tank 28 is computed so as to supply the air to each of the main air chambers 4FL, 4FR, 4RL and 4RR, and based on the computed vehicle height compensation CR at the rear-wheel side the variable pressure ΔPRL in the low pressure reserve tank 68 is also computed so as to absorb the air from each of the main air chambers 4FL, 4FR, 4RL and 4RR. More particularly, the variable pressure ΔPFH in the front-wheel side high pressure reserve tank 28 varies as the tank 28 supplies the air corresponding to the vehicle height compensation CF. According to MAP-c shown in FIG. 14, the variable pressure ΔPFH is computed based on the vehicle height compensation CF and the pressure P4FL or P4FR in the air spring at the front-wheel side as the parameter. On the other hand, the variable pressure ΔPRL in the rear-wheel side low pressure reserve tank 68 varies as the tank 68 absorbs the air corresponding to the vehicle height compensation CR. According to MAP-d shown in FIG. 15, the variable pressure ΔPRL is computed based on the vehicle height compensation CR and the pressure P4RL or P4RR in the main air chamber at the rear wheels as the parameter.

Based on the variable pressures ΔPFH and ΔPRL computed at step 255, a time period T is computed at step 260 for actuating each of the valves connecting the high pressure reserve tank 28 or the low pressure reserve tank 68 with the main air chambers 4FL, 4FR, 4RL and 4RR. As for the front wheels of the vehicle, pressure drop period tCF for the front-wheel side high pressure reserve tank 28 is computed according to MAP-e shown in FIG. 16. To elaborate, the period tCF is calculated based on the variable pressure $\Delta$PFH as the parameter and the ratio of the pressure PFH in the high pressure reserve tank to the pressure P4FL or P4FR in the main air chamber. Then, based on the pressure drop period tCF, a valve actuation time period TCF is computed according to the following equation (2) considering a line resistance coefficient, valve coefficient, etc.:

$$TCF = A \times tCF + B \quad (2)$$

Regarding the rear wheels of the vehicle, pressure rise period tDR for the rear-wheel side low pressure reserve tank 68 is computed according to MAP-f shown in FIG. 17. More particularly, the period tDR is calculated based on the variable pressure $\Delta$PRL as the parameter and the ratio of the pressure P4RL or P4RR in the main air chamber to the pressure PRL in the low pressure reserve tank. Then, based on the pressure rise period tDR, a valve actuation time period TDR is computed according to the following equation (3) considering line resistance coefficient, valve coefficient, etc.:

$$TDR = C \times tDR + D \quad (3)$$

After the valve actuating time periods TCF and TDR are computed at step 260, step 265 sets the timer for the predetermined time period t1, e.g., 60 msec. which is used for the processing procedure described later. Then, at step 270 actuation is made on the high pressure reservoir valve 26; the leveling valves 42 and 44; the discharge valves 64 and 66 corresponding to the respective valve actuating time periods TCF and TDR. For example, these actuating valves are simultaneously closed in such a manner that: the high pressure reservoir valve 26 and the leveling valves 42 and 44 are actuated for the time period TCF computed for the front wheels; and the discharge valves 64 and 66 are actuated for the time period TDR computed for the rear wheels.

Figure 9A:
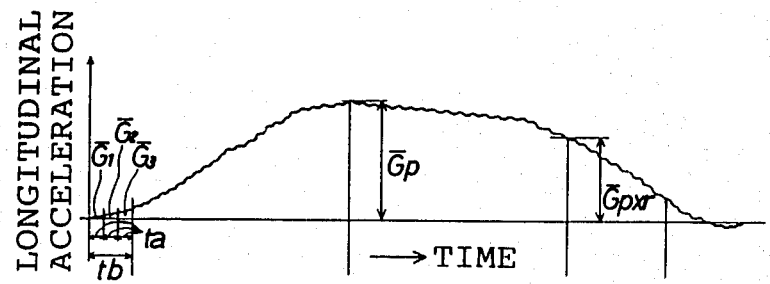
FIGS. 9A, 9B, 9C, 9D and 9E show relations between time and a longitudinal acceleration, control signals, and a vehicle height, respectively.
Figure 9B:
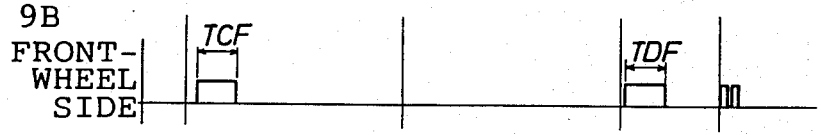
Figure 9C:
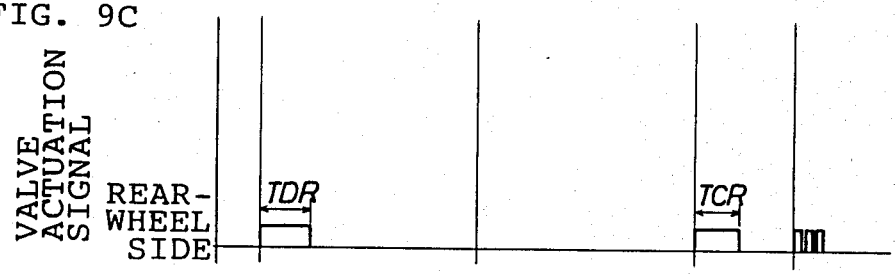
Figure 9D:
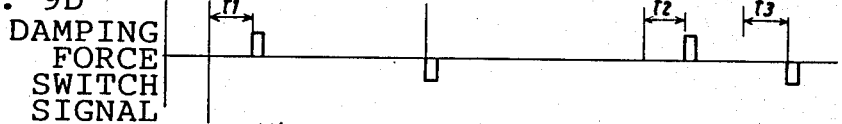
Figure 9E:
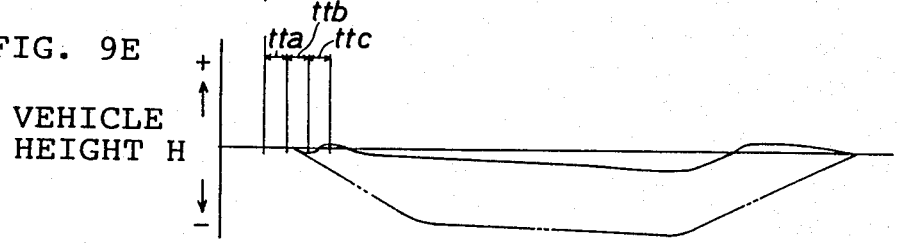

With reference to FIGS. 9A–9E, when the brake pedal 97 is pressed down, the longitudinal acceleration G starts to increase after a short time, and thereafter the vehicle height H starts to change as shown in a continuous line in FIG. 9E. When an actuation signal is output to the valves through the processing procedure at step 270, the valves start to operate after a predetermined delay time tta, e.g., 30 msec. As a result, the compressed air is rapidly supplied from the high pressure reserve tank 28 to the main air chambers 4FR and 4FL at the front-wheel side; and the air is rapidly discharged from the main air chambers 4RL and 4RR at the rear-wheel side to the low pressure reserve tank 68. Thus, the supply and discharge of the air affects the vehicle height H after a particular short delay time ttb, e.g., 30 msec. The interrupted line in FIG. 9E indicates a change of the vehicle height H in case that the air is not supplied or discharged. In the present embodiments, the predetermined time period t1 is set at step 265 to be equal to the sum of the delay time tta and ttb (i.e., t1=tta+ttb). Thereby, like the target vehicle height shown in FIG. 12, the vehicle height is controlled to be lower than the standard height and the front-wheel side slightly lower than the rear-wheel side. Such forward tilting attitude prevents the vehicle from "aiming", which means changes in the illuminating angles of the head lamps are reduced.

If it is determined at aforementioned step 220 dive control flag is being set, and further if it is determined at step 275 a reset control flag is not being set, it is determined at step 280 whether or not the predetermined time period t1 has elapsed on the timer which is set at step 265. If the period t1 has already passed and it is determined at the subsequent step 285 that each damping force of the individual shock absorbers 3FL, 3FR, 3RL and 3RR has not been changed, the damping force is increased to a higher degree at step 290, so as to prevent a vehicle body from oscillating due to rapid air supply and discharge. If the damping force is "low", for example, it is changed to "medium" by energizing the absorber motors 8FL, 8FR, 8RL and 8RR. If the damping force is "medium", it is changed to "high". Under the condition that: the damping force is switched to a higher degree at step 290; or the predetermined period t1 has not elapsed at step 280; or the damping force has been already switched at step 285, the present control routine is repeatedly executed until the valve actuating periods TCF and TDR have elapsed. If it is determined at step 295 valve actuation has finished, that is, those determined periods have passed, the program proceeds to step 300 where maximum average longitudinal acceleration $\overline{G}P$ is detected. If it is determined at step 305 the maximum acceleration $\overline{G}P$ is detected, the damping force of the shock absorbers 3FL, 3FR, 3RL and 3RR increased at step 290 is decreased back to the original value at step 310.

If the pressing force of the brake pedal becomes smaller, the longitudinal acceleration G decreases, and the current average longitudinal acceleration $\overline{G}$ reaches a determined ratio $\gamma$, e.g., 70% or less of the maximum acceleration $\overline{G}P$ at step 315 (i.e., $|\overline{G}| \leq |\overline{G}p| \times \gamma$), then at step 320 the reset control flag is set. Step 325 sets the timer for the predetermined time period t2, e.g., 60 msec which is used for the processing procedure described later. Thereafter at step 330 the valves are actuated to restore the attitude of the vehicle, that is, to raise the target vehicle height, which has been controlled lower than the standard height with the front wheels lower than the rear wheels, up to the standard height. Consequently, the vehicle attitude is controlled corresponding to the vehicle compensations CF for the front-wheel side and CR for the rear-wheel side calculated at step 250, as opposed to the attitude controlled at steps 255 through 270. Specifically, according to the aforementioned MAP-i, the variable pressure $\Delta$PFL is computed based on the vehicle height compensation CF for the front-wheel side and the pressure P4FL or P4FR in the main air chamber at the front wheels as the parameter. The variable pressure $\Delta$PFL in the front-wheel side low pressure reserve tank 62 varies as the tank 62 takes in the air corresponding to the vehicle height compensation CF. According to MAP-h, the variable pressure $\Delta$PRH in the rear-wheel side high pressure reserve tank 32 is computed based on the vehicle height compensation CR for the rear-wheel side. Based on the computed variable pressures $\Delta$PFL and $\Delta$PRH, the front and rear-wheel side valve actuation time periods TDF and TCR are computed considering MAP-j, MAP-k and line resistance coefficient, etc. in the same way as the processing procedure at the aforementioned step 260. At step 330, actuated are the discharge valves 58 and 60 for the time period TDF computed for the front-wheel side, and high pressure reservoir valve 30, leveling valves 46 and 48 for the time period TCR computed for the rear-wheel side, so that the valves 30, 46, 48, 58 and 60 simultaneously close.

The valves are actuated and the present control routine is repeatedly executed. Then, if it is determined that a dive flag is set at step 220 and that the reset control flag is set at step 275, the program goes on to step 335, where it is determined whether or not a flag for vehicle height feedback is set. If NO, at step 340 it is determined whether or not the predetermined time period t2 has elapsed on the timer set at step 325. If the period t2 has already passed and it is determined at the subsequent step 345 that each damping force of the individual shock absorbers 3FL, 3FR, 3RL and 3RR has not been switched, the damping force is increased by a degree at step 350. If the damping force is "low", for example, it is changed to "medium" by energizing the absorber motors 8FL, 8FR, 8RL and 8RR. If the damping force is "medium", it is changed to "high". Under the condition that the damping force is increased at step 350, or the predetermined period t2 has not elapsed at step 340, or the damping force has been already switched at step 345, the present control routine is repeatedly executed until it is determined at step 355 that the valve actuation is finished according to the respective valve actuation periods TDF and TCR. The valve actuation is finished at step 355, and at step 360 the absolute value of average longitudinal acceleration $\overline{G}$ is equal to or less than a predetermined acceleration G1, e.g., 0.15 g (i.e., $|\overline{G}| \leq G1$), then step 365 sets the timer for a predetermined time period t3, e.g., 300 msec which is used for the processing procedure described later. If at the subsequent step 370, it is determined that the absolute value of the average vehicle height $\overline{H}$ is equal to or greater than a predetermined value $\Delta Ho$, the flag for the vehicle height feedback is set at step 375 and valve actuation duty ratio D is computed at step 380. The valve actuation duty ratio D is computed depending on the average vehicle height $\overline{H}$, i.e., the compensation $\Delta H$, according to FIG. 18. More particularly, the valve actuation duty ratio D is computed so as to actuate the high pressure reservoir valves 26 and 30 and the leveling valves 42, 44, 46 and 48 for supplying the compressed air from the high pressure reserve tanks 28 and 32 to one of the main air chambers 4FL, 4FR, 4RL and 4RR corresponding to the wheel for which the average vehicle height $\overline{H}$ value is negative. Alternatively, the valve actuation duty ratio D is computed so as to actuate the discharge valves 58, 60, 64 and 66 for releasing the air to the low pressure reserve tanks 62 and 68 from one of the main air chambers 4FL, 4FR, 4RL and 4RR corresponding to the wheel for which the average vehicle height $\overline{H}$ value is positive. Then, the valves are actuated at step 385 according to the duty ratio D computed at step 380.

On the other hand, after the valves are actuated and the present control routine is repeatedly executed, it is determined at step 335 the flag for vehicle height feedback is set. Then the program goes to step 390 where time period t3 has elapsed. At the following step 395, it is determined whether or not the damping force has been already switched. If NO, at step 400, the damping force of the shock absorbers 3FL, 3FR, 3RL and 3RR, which has been previously increased to a higher degree at step 350, is decreased to the previous degree. If it is determined at step 370 that the absolute value of the average vehicle height $\overline{H}$ is less than the predetermined value $\Delta Ho$ and at step 405 that the damping force has been already switched, and thus, all the aforementioned flags are cleared at step 410.

Alternatively, if it is determined at step 215 that rapid control interruption flag (described later) is being set, the target vehicle height control is executed at step 411 in the following manner. If the absolute value of the difference between the vehicle height H of each wheel detected by the height sensors 80, 82, 84 and 86 and the target vehicle height Hn during the normal straight forward driving is greater than a predetermined value $\Delta H$, e.g., the minimum value of the controllable vehicle height, then the vehicle height H of each wheel is altered to the target vehicle height Hn by actuating the compressor 10 and the valves. More particularly, as for the wheel which is lower than the target vehicle height Hn, the compressor 10 is actuated together with the supply valve 22 and one of the leveling valves 42, 44, 46 and 48 corresponding to the wheel for which the vehicle height H is low, thereby supplying the compressed air to one of the main air chambers 4FL, 4FR, 4RL and 4RR corresponding to the wheel for which the vehicle height H is low. In this case, the amount of the supplied compressed air depends on the capacity of the compressor 10, the passage resistance, etc., and the vehicle height H gradually reaches the target vehicle height Hn. When the target vehicle height Hn is attained, the actuation for the compressor 10 and the valves 22, 42, 44, 46 and 48 is stopped.

As for the wheel which is higher than the target vehicle height Hn, the compressor 10 is not actuated, but the actuation is made for the discharge valve 16, the connection valve 24 and one of the discharge valves 58, 60, 64 and 66 corresponding to the wheel for which the vehicle height H is high. As a result, the air s released to the external air from one of the main air chambers 4FL, 4FR, 4RL and 4RR corresponding to the wheel for which the vehicle height H is high. The amount of the released air depends on the throttle 18, the passage resistance, etc., and the vehicle height H gradually reaches the target vehicle height Hn. When the target vehicle height Hn is attained, the actuation for the valves 16, 24, 58, 60, 64 and 66 is stopped.

If it is determined at step 225 that there are not dive conditions or at step 235 that the acceleration difference $\Delta G$ is smaller than the predetermined acceleration difference $\Delta Go$, the program goes to step 412 where it is determined whether or not there are other rapid control conditions. If YES, other rapid control is employed at step 413. For example, at step 412 it is determined there are squat conditions as follows: throttle opening So sections, e.g., 3 sections among S sections, e.g., 6 sections are detected within a predetermined time, e.g., 80 msec by a throttle opening sensor (not shown); an amount of scatter of each vehicle height detected by vehicle height sensors 80, 82, 84 and 86 is less than a predetermined value, e.g., 24 mm; the absolute value of the lateral acceleration Ga is smaller than a predetermined acceleration Gao, e.g., 0.3 g; the absolute value of steering angle $\theta$ of the steering wheel 88 detected by the steering angle sensor 90 is less than the specified angle $\theta o$, e.g., 45 degrees; and the absolute value of the steering speed $\dot{\theta}$ is smaller than the specified steering speed $\dot{\theta} o$, e.g., 140 degrees/sec. Just after such squat conditions are detected, the maximum average longitudinal acceleration $\overline{GMAX}$ and the minimum average longitudinal acceleration $\overline{GMIN}$ are detected. Subsequently, the acceleration difference $\Delta G$ therebetween is computed. If the acceleration difference $\Delta G$ is equal to or more than the specified acceleration, e.g., 0.072 g, the estimated longitudinal acceleration $\alpha$ is obtained from the graph, i.e., MAP-a shown in FIG. 10. Based on the estimated longitudinal acceleration $\alpha$, vehicle height compensation C is computed.

Figure 19:
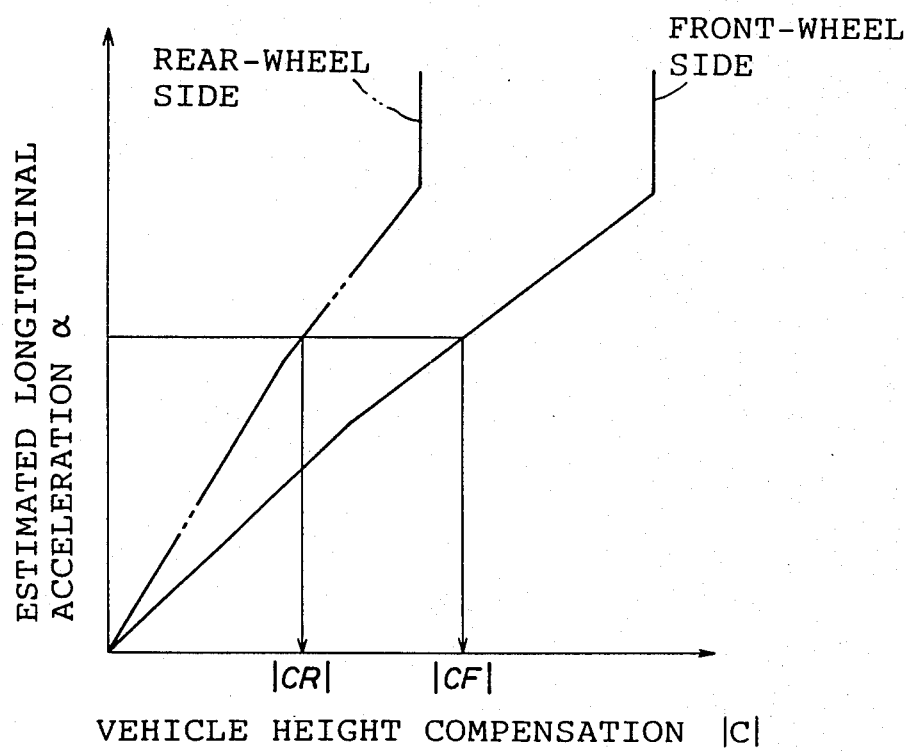
FIG. 19 is a graph showing a relation between an estimated longitudinal acceleration and a vehicle height compensation during a squat control.
Figure 20:
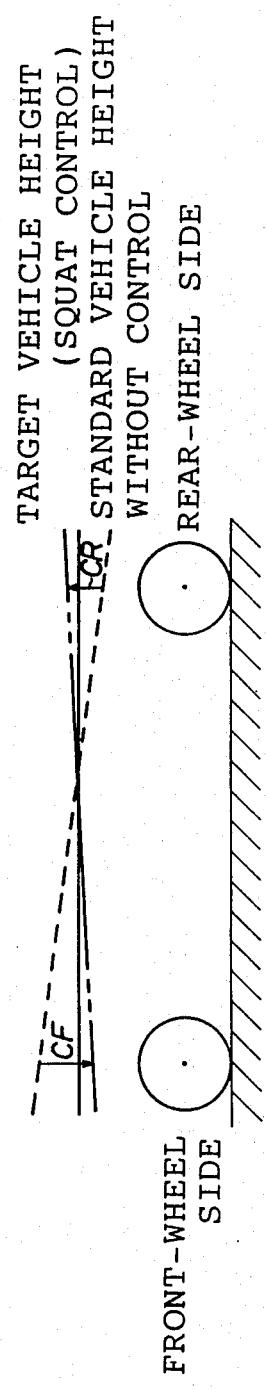
FIG. 20 is an illustration showing a comparison between a standard vehicle height and a target height under a squat control.
Figure 21:
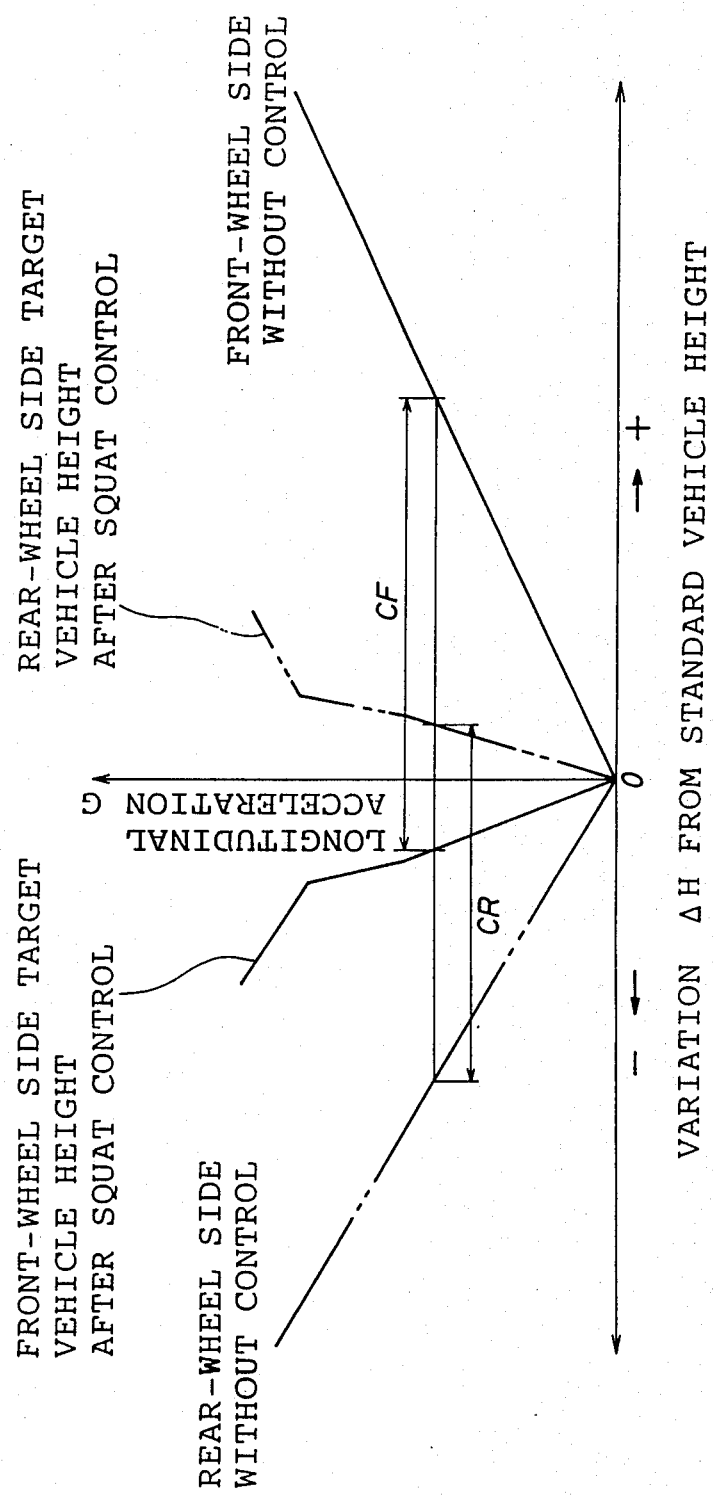
FIG. 21 is a graph showing a relation between a longitudinal acceleration and a variation from standard vehicle height during a squat control.

Specifically, the vehicle height compensation C is computed according to MAP-1 memorized in ROM 104, that is, the graph shown in FIG. 19, which shows the estimated longitudinal acceleration $\alpha$ on the axis of ordinate and the absolute value of the vehicle height compensation C on the axis of abscissa. The graph in FIG. 19 is set up so that, as shown in FIG. 20, the target vehicle height under a squat control (interrupted line) is higher at the rear-wheel side than the standard vehicle height (continuous line), and at the same time the target vehicle height of the front wheel side is slightly lower than that of the rear-wheel side. The differences CF at the front-wheel side and CR at the rear-wheel side between the target vehicle height (interrupted line) and the vehicle height (broken line) after the vehicle attitude change without squat control are obtained as controlled variables. The controlled variables CF and CR are obtained based on the longitudinal acceleration G according to the graph in FIG. 21 which shows the longitudinal acceleration G on the axis of ordinate and a variation $\Delta H$ from standard vehicle height on the axis of abscissa. The graph indicates vehicle height variations of the front and rear wheel side without squat control and target vehicle height variations thereof after the squat control, respectively with the longitudinal acceleration G. Therefrom obtained are the controlled variables corresponding with the longitudinal acceleration G, that is, the differences CF at the front-wheel side and CR at the rear-wheel side between the target height and the vehicle height without squat control. The differences CF and CR establish the graph in FIG. 19. Particularly, the rear-wheel side vehicle height compensation CR as the lifting distance of the lowered rear wheels is set smaller than the front-wheel side vehicle height compensation CF as the descending distance of the raised front wheels.

In the same way as the aforementioned dive control, based on the vehicle height compensations CF and CR, the air is supplied to or discharged from each of the main air chambers 4FL, 4FR, 4RL and 4RR.

Alternatively, in the same way as the aforementioned dive control, variable pressure $\Delta PRH$ and $\Delta PFL$ are computed based on the vehicle height compensation C. The variable pressure $\Delta PRH$ in the rear-wheel side high pressure reserve tank 32 varies as the tank 32 supplies the air to the main air chambers 4RL and 4RR corresponding to the vehicle height compensation C. The variable pressure $\Delta PFL$ in the front-wheel side low pressure reserve tank 62 varies as the tank 62 takes in the air from the main air chambers 4FL and 4FR corresponding to the vehicle height compensation C.

Subsequently, based on the computed variable pressure $\Delta PRH$ and $\Delta PFL$, computed is each valve actuation time period T during which the high pressure reserve tank 32 or the low pressure reserve tank 62 communicates with the main air chambers 4FL, 4FR, 4RL and 4RR. Then, actuated are the high pressure reservoir valve 30, leveling valves 46, 48, and discharge valves 58, 60 for the time period T, so that the valves 30, 46, 48, 58 and 60 are simultaneously closed. Thereby, the air is supplied to or discharged from each of the main air chambers 4FL, 4FR, 4RL and 4RR to control the vehicle's attitude.

The vehicle attitude is thus controlled so that the vehicle height of the rear-wheel side is higher than that of the front-wheel side, which means a forward tilting attitude of the vehicle is attained. At the same time, the vehicle height at the rear-wheel side is controlled to be higher than the standard vehicle height.

For another example of rapid control, a roll control is described hereunder. In the same way as the dive control, it is determined there exist roll conditions, if the current vehicle speed V is not less than a predetermined speed Vb, e.g., 15 km/h and an absolute value of the current average longitudinal acceleration $\overline{G}$ is less than a predetermined acceleration Gb, e.g., 0.3 g. Thereafter, a maximum average longitudinal acceleration $\theta MAX$ and a minimum $\theta MIN$ are detected by the steering angle sensor 90 within a predetermined period immediately after the operation of the steering wheel 88. The difference of these maximum $\theta MAX$ and minimum $\theta MIN$ becomes the steering angle difference $\theta PP$. Based on the steering angle difference $\theta PP$, a predetermined estimated lateral acceleration $\alpha a$ is computed, according to which vehicle height compensation C is obtained.

Figure 22:
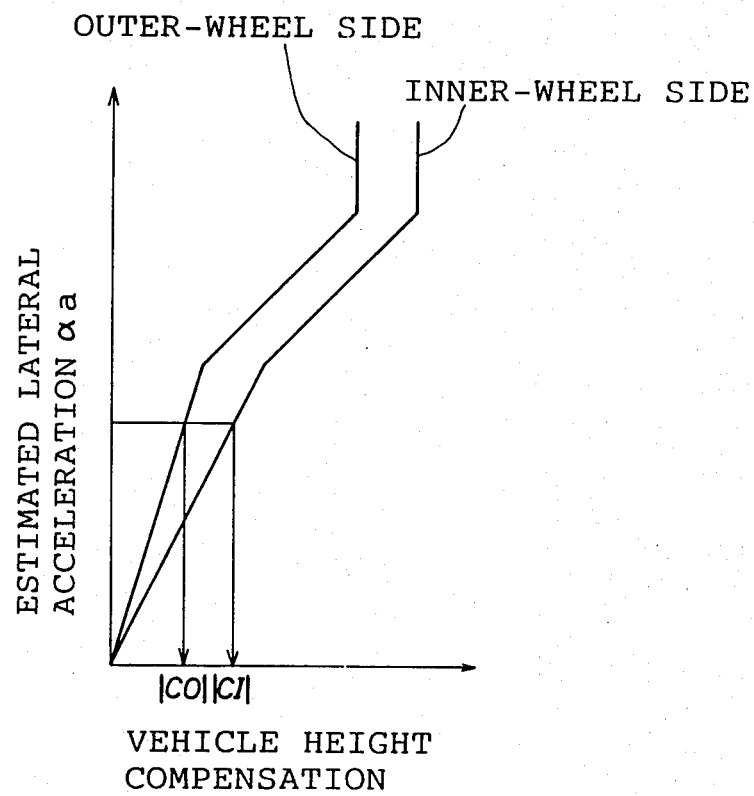
FIG. 22 is a graph showing a relation between an estimated lateral acceleration and a vehicle height compensation during a roll control.
Figure 23:
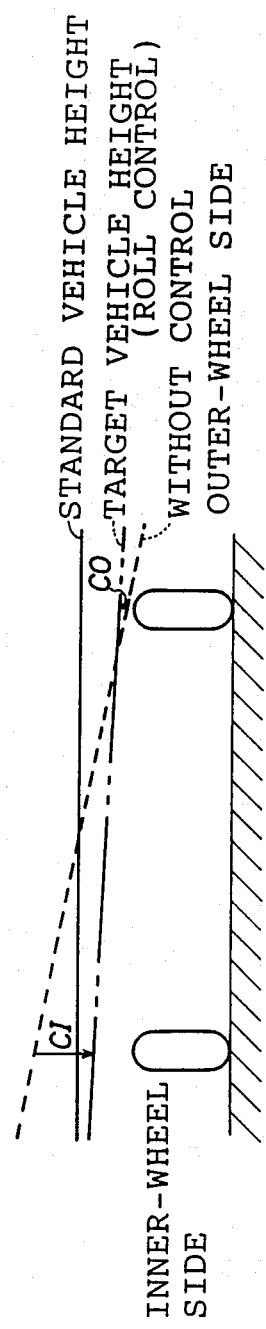
FIG. 23 is an illustration showing a comparison between a standard vehicle height and a target height under a roll control.
Figure 24:
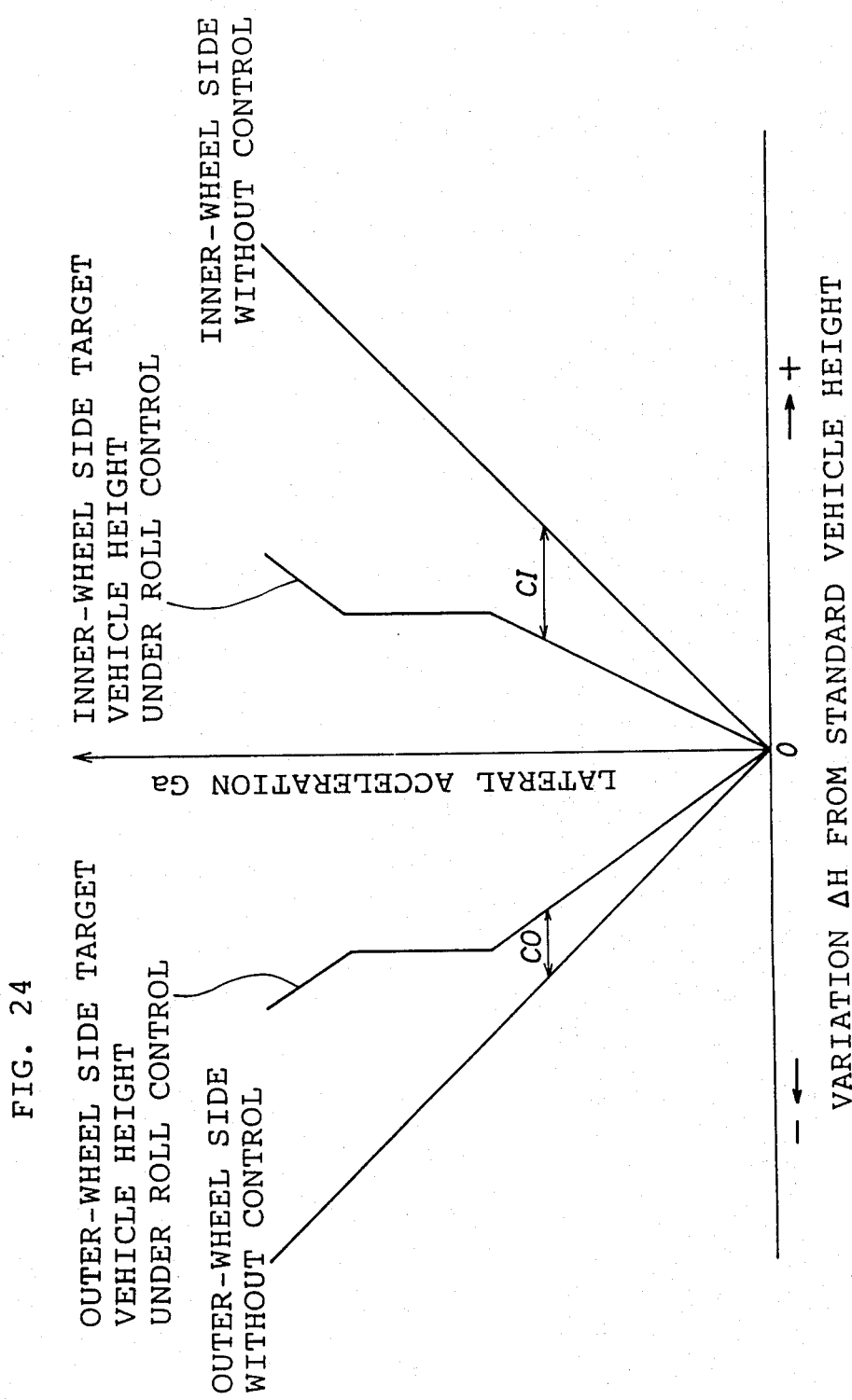
FIG. 24 is a graph showing a relation between a lateral acceleration and a variation from standard vehicle height during a roll control.

The vehicle height compensation C is computed from MAP-m already memorized in ROM 104, corresponding to the graph in FIG. 22, which shows the estimated lateral acceleration $\alpha a$ on the axis of ordinate and an absolute value of vehicle height compensation on the axis of abscissa. The graph in FIG. 22 is set up so that as shown in FIG. 23 the target vehicle height (interrupted line) of the outer wheels of the cornering vehicle is lower than that of the inner wheels thereof, and the target vehicle height of the both side wheels is lower than the standard vehicle height. Subsequently, as controlled valuables obtained are the differences CI at the inner wheels of the cornering vehicle and CO at the outer wheels thereof between the target vehicle height (interrupted line) and the vehicle height (broken line) after vehicle attitude change without roll control. The controlled valuables CI and CO are obtained according to a lateral acceleration Ga in the graph of FIG. 24, which shows the lateral acceleration Ga on the axis of ordinate and variation $\Delta H$ from standard vehicle height on the axis of abscissa. Specifically, the graph in FIG. 24 indicates the height variations of the inner and outer wheels of the cornering vehicle without roll control and the target height variations thereof after roll control respectively with the lateral acceleration Ga. Therefrom obtained are the controlled variables corresponding with the lateral acceleration Ga, that is, the differences CI of the inner wheels of the cornering vehicle and CO of the outer wheels thereof between the target vehicle height and the height without roll control. The differences CI of the inner wheels and CO of the outer wheels establish the graph in FIG. 22. Particularly, the outer-wheel side vehicle height compensation CO as the lifting distance of the lowered outer wheels is set smaller than the inner-wheel side vehicle height compensation CI as the descending distance of the raised inner wheels.

Next, in the same way as aforementioned dive control, based on the vehicle height compensations CO and CI, the air is supplied to or discharged from each of main air chambers 4FL, 4FR, 4RL and 4RR, to control the vehicle attitude so that the vehicle height of the outer wheels of the cornering vehicle is lower than that of the inner wheels thereof and at the same time the outer and inner wheel side vehicle heights are lower than the standard vehicle height.

Alternatively, in the same way as the aforementioned dive control, variable pressures ΔPFH, ΔPRH, ΔPFL and ΔPRL are computed in response to the vehicle height compensation C. The variable pressure ΔPFH and ΔPRH in the front and rear-wheel side high pressure reserve tanks 28 and 32 vary as the tanks 28 and 32 supply the air to the main air chambers 4FL, 4FR, 4RL and 4RR corresponding to the compensation C. The variable pressures ΔPFL and ΔPRL in the front and rear-wheel side low pressure reserve tanks 62 and 68 vary as the tanks 62 and 68 take in the air from the main air chambers 4FL, 4FR, 4RL and 4RR corresponding to the compensation C.

Subsequently, based on the computed variable pressures ΔPFH, ΔPRH, ΔPFL and ΔPRL, computed is each valve actuation time period T during which the high pressure reserve tanks 28, 32, or the low pressure reserve tanks 62, 68 communicate with each of main air chambers 4FL, 4FR, 4RL and 4RR. When the vehicle corners clockwise, actuated are the high pressure reservoir valves 26 and 30, leveling valves 42 and 46, and discharge valves 60 and 66 for the time period T, so that the valves 26, 30, 42, 46, 60 and 66 close simultaneously. Thereby, the air is supplied to or discharged from each of main air chambers 4FL, 4FR, 4RL and 4RR, to control the vehicle attitude so that the vehicle height of the outer wheels of the cornering vehicle is lower than that of the inner wheels thereof and at the same time the outer and inner wheel side vehicle heights are lower than the standard vehicle height.

Figure 8:
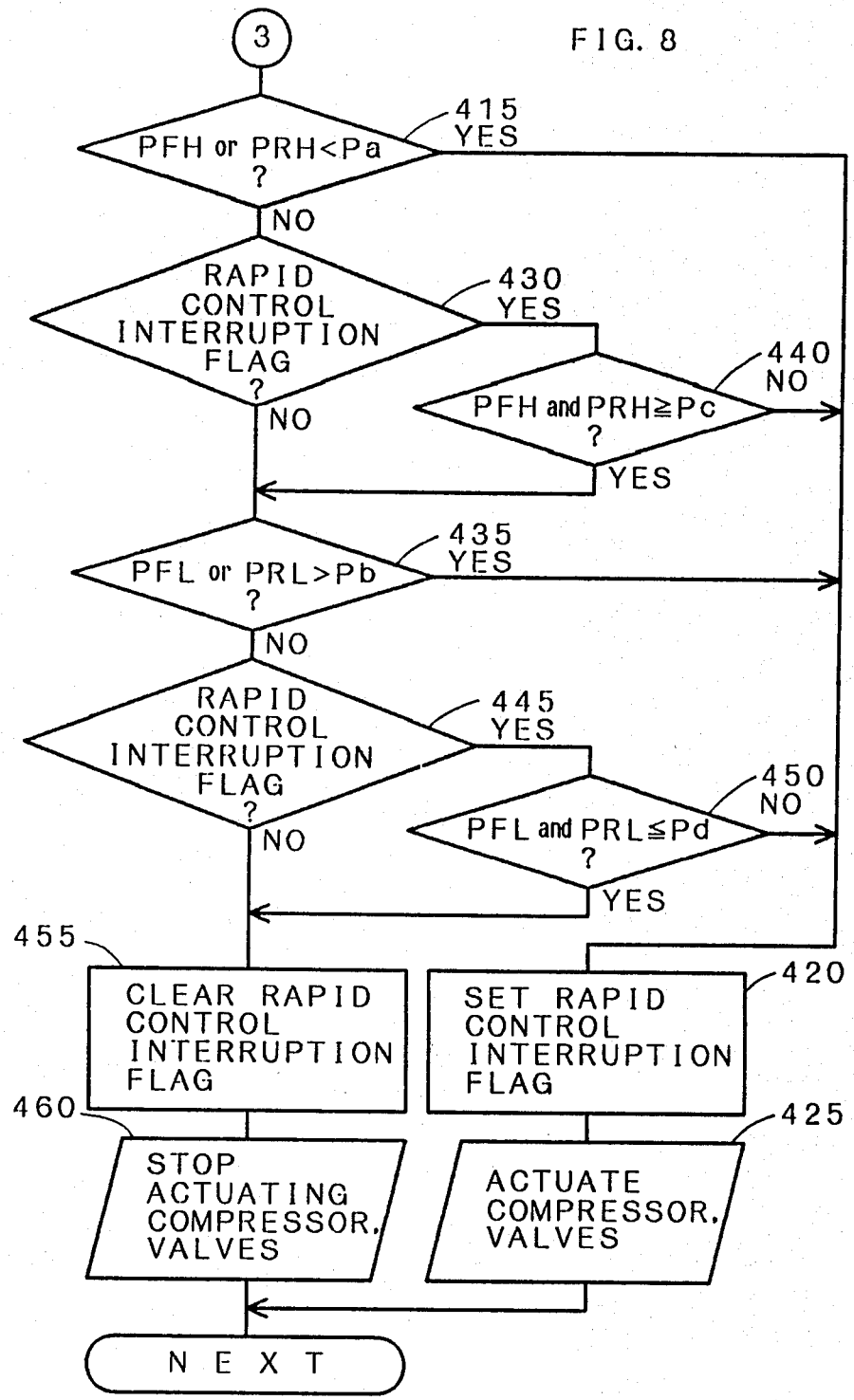

At step 415 shown in FIG. 8, it is determined whether the pressure PFH in the high pressure reserve tank 28 detected by the pressure sensor 34 or the pressure PRH in the high pressure reserve tank 32 detected by the pressure sensor 36 is less than a predetermined high interrupting pressure Pa, e.g., 9.5 atmosphere (absolute pressure)—that is, the pressure unsuitable for the aforementioned rapid attitude control—as a result of the above-described control for consuming the compressed air in the high pressure reserve tank 28 or 32. If the answer at step 415 is YES, the rapid control interruption flag is set at step 420. Then, actuation is made at step 425 on: the compressor 10 by means of the compressor motor 9; the supply valve 22; one of the leveling valves 42, 44, 46 and 48; the suction valve 76, etc. As a result, one of the main air chambers 4FL, 4FR, 4RL and 4RR is supplied with the air from the low pressure reserve tanks 62 and 68, or with the compressed atmosphere via the check valve 78 in case that the pressure in the low pressure reserve tanks 62 and 68 is lower than the atmospheric pressure.

On the other hand, if it is determined at step 415 that the pressure PFH or PRH is not less than the high pressure interruption pressure Pa and determined at step 430 that the rapid control interruption flag is not being set, then the program proceeds to step 435. At step 435 it is determined whether the pressure PFL in the low pressure reserve tank 62 detected by the pressure sensor 70 or the pressure PRL in the low pressure reserve tank 68 detected by the pressure sensor 72 exceeds a predetermined low interrupting pressure Pb, e.g., 6 atmosphere (absolute pressure); that is, the pressure unsuitable for the aforementioned rapid attitude control. If the answer at step 435 is YES, the program proceeds to the above-described steps 420 and 425.

Alternatively, if it is determined at step 430 that the rapid control interruption flag is being set, that is, if the compressor 10 and the valves are being actuated, the compressor 10 and the valves are repeatedly actuated at step 425 until it is determined at step 440 that the pressures PFH in the high pressure reserve tank 28 and PRH in the high pressure reserve tank 32 are equal to or greater than a particular pressure Pc, e.g., 11 atmosphere (absolute pressure), which is predetermined as exceeding the high interrupting pressure Pa so as to sufficiently execute the rapid attitude control. If the pressures PFH and PRH exceed this pressure Pc, the program proceeds to step 435.

If it is determined at step 435 that either of the pressures PFL and PRL does not exceed the low interrupting pressure Pb, and further if it is determined at step 445 that the rapid control interruption flag is being set, it is determined at step 450 whether the pressures PFL in the low pressure reserve tank 62 and PRL in the low pressure reserve tank 68 are less than a particular pressure Pd, e.g., 5 atmosphere (absolute pressure), which is predetermined as being less than the low interrupting pressure Pb so as to sufficiently execute the rapid attitude control. If the pressures PFL and PRL exceed this predetermined pressure Pd, the program proceeds to steps 420 and 425. On the other hand, if it is determined at step 450 that the pressures PFL and PRL are less than the predetermined pressure Pd, it means that the rapid attitude control can e executed because the pressures PFH and PRH in the high pressure reserve tanks 28 and 32 are equal to or greater than the predetermined pressure Pc and the pressures PFL and PRL in the low pressure reserve tanks 62 and 68 are equal to or less than the predetermined pressure Pd as a result of the processing procedures at steps 420 and 425. Thus, at the subsequent step 455 the rapid control interruption flag is cleared, and at step 460 the actuation is stopped on: the compressor 10 by means of the compressor motor 9; the supply valve 22; the leveling valves 42, 44, 46 and 48; the suction valve 76; and so forth. Alternatively, if it is determined at step 445 that the rapid control interruption flag is not being set, the aforementioned steps 455 and 460 are also executed. After step 425 or 460, the program proceeds to "NEXT".

In the first embodiment, steps 230, 235, 245, 260 and 270 function as the inclination control means M4.

The electronically controlled suspension system of the embodiment described hereinbefore detects the vehicle inclination. For example, at step 235 it is determined the acceleration difference ΔG is equal to or more than a specified acceleration difference ΔGo, which means the inclination of the vehicle is detected. For example, if the phenomenon of dive is detected, the air is supplied to or discharged from the main air chambers 4FL, 4FR, 4RL and 4RR to control the vehicle's attitude, in response to the front-wheel side vehicle height compensation CF as the lifting distance of the lowered front wheels which is set smaller than the rear-wheel side vehicle height compensation CR as the descending distance of the raised rear wheels. The controlled vehicle height is lower than the standard height, and at the same time, the vehicle height of the front wheels is lower than the rear wheels. Alternatively, if the phenomenon of squat arises, the rear-wheel side vehicle height compensation CR as the lifting distance of the lowered rear wheels is smaller than the front-wheel side vehicle height compensation CF as the descending distance of the raised front wheels. According to the compensations CR and CF, the air is supplied to or discharged from the main air chambers 4FL, 4FR, 4RL and 4RR, and the vehicle's attitude is controlled so that the front-wheel side becomes lower than the rear-wheel side, and the rear-wheel side vehicle height becomes higher than the standard vehicle height. If the phenomenon of roll arises, the outer-wheel side vehicle height compensation CO as the lifting distance of the lowered outer wheels is smaller than the inner-wheel side vehicle height compensation CI as the descending amount of the raised inner wheels. According to the compensations CO and CI, the air is supplied to or discharged from the main air chambers 4FL, 4FR, 4RL and 4RR to control the vehicle's height. The controlled vehicle height, with the outer wheels of the cornering vehicle lower than the inner wheels thereof, is lower than the standard vehicle height.

As described above, the electronically controlled suspension system of the embodiment can prevent the vehicle from diving by lowering the vehicle height H below the standard height and increasing the spring constant of the air springs 2FL, 2FR, 2RL and 2RR. Therefore, the road-adherence ability, the braking performance and the steering stability can be enhanced. Keeping the forward tilting attitude prevents the vehicle from "aiming", which means variations of head lamp illuminating angles are reduced. Furthermore, the squat control is carried out to obtain the vehicle's forward tilting attitude. Thereby, the influence of dynamic lift due to wind pressure is minimized, the road-adherence ability is improved, and the steering stability is enhanced. "Aiming" is also prevented, that is, variations of the head lamp illuminating angles are reduced. Still furthermore, the vehicle is prevented from rolling by lowering the vehicle height H below the standard height and increasing the spring constant of the air springs, 2FL, 2FR, 2RL and 2RR. Thus, the road-adherence ability on an uneven road surface is increased, and the steering stability is enhanced. Consequently, the electronically controlled suspension system of the embodiment prevents the vehicle from diving, squatting or rolling as the driving status changes, and enhances the road-adherence ability and the steering stability.

Alternatively, the electronically controlled suspension system of the embodiment described hereinbefore detects the vehicle inclination at steps 225 through 235, 295 through 315, and 370. At steps 260 and 380, the electronically controlled suspension system computes the communication time period T, for which each of the main air chambers 4FL, 4FR, 4RL and 4RR communicates with the individual reserve tanks 28, 32, 62 and 68. At steps 270, 330 and 385, for the computed valve actuation time period T, actuated are the high pressure reservoir valves 26 and 30, leveling valves 42, 44, 46 and 48, and discharge valves 58, 60, 64 and 66, at such a timing that the valves 26, 30, 42, 44, 46, 48, 58, 60, 64 and 66 close simultaneously.

Consequently, the electronically controlled suspension system simultaneously supplies and releases the air to and from each of the main air chambers 4FL, 4FR, 4RL and 4RR, so that the aforementioned valves 26, 30, 42, 44, 46, 48, 58, 60, 64 and 66 are simultaneously closed. Each vehicle height is thus altered at the same time. The supply and release of the air to and from a wheel does not affect the target vehicle height of the other wheels. Also, the target vehicle height is attained with the minimum quantity of the air supply and release. Moreover, the time required for controlling the vehicle's attitude can be reduced.

Figure 25:
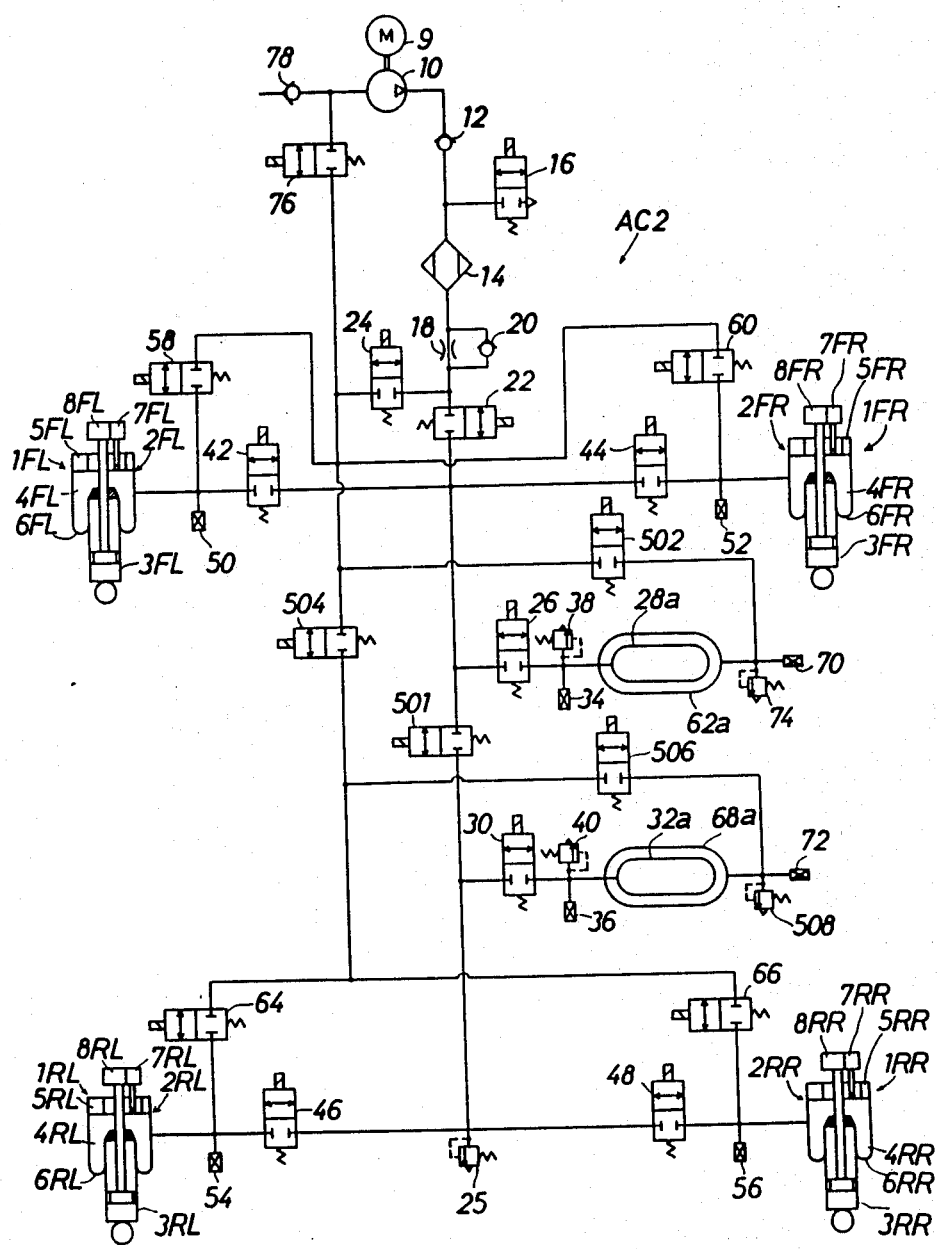
FIG. 25 is an air circuit diagram showing another embodiment of the present invention.

Set forth is the explanation of another embodiment different from that of FIG. 3 with reference to FIG. 25. In this air circuit AC2, the same components as those of the air circuit AC are designated by the same reference numerals.

In the air circuit AC2, a high pressure reserve tank 28a and a low pressure reserve tank 62a at the front wheel side as well as a high pressure reserve tank 32a and a low pressure reserve tank 68a at the rear wheel side are made integral. One side of the high pressure reservoir valve 26 connected to the front-wheel side high pressure reserve tank 28a and the high pressure reservoir valve 30 connected to the high pressure reserve tank 32a are connected to each other through a communication valve 501 for establishing and blocking the communication. As a result, even if the two high pressure reservoir valves 26 and 30 are simultaneously energized, no communication is established between the two high pressure reserve tanks 28a and 32a unless the communication valve 501 is energized.

Moreover, the front-wheel side low pressure reserve tank 62a is connected to one side of a low pressure reservoir valve 502 for establishing and blocking the communication, and the other side of the valve 502 is connected to the suction valve 76 and the front-wheel side two discharge valves 58 and 60 and to one side of a communication valve 504 for establishing and blocking the communication. The other side of this communication valve 504 is connected to the low pressure reserve tank 68a through a low pressure reservoir valve 506 for providing and blocking the communication and to the two rear-wheel side discharge valves 64 and 66. Furthermore, the low pressure reserve tank 68a is connected to a relief valve 508 which is set to operate at a predetermined pressure. As a result, the low pressure reserve tanks 62a and 68a have their communications blocked from other valves by the low pressure reservoir valves 502 and 506 so that they do not communicate with each other until the communication valve 504 is energized, even if the two low pressure reservoir valves 502 and 506 are energized.

This air circuit AC2 allows the main air chambers 4FL and 4FR and the low pressure reserve tank 62a to communicate with each other by energizing the low pressure reservoir valve 502 and the discharge valves 58 and 60 at the front wheel side. Moreover, the main air chambers 4RL and 4RR and the low pressure reserve tank 68a are enabled to communicate by energizing the low pressure reservoir valve 506 and the discharge valves 64 and 66 at the rear wheel side.

According to the aforementioned air circuit AC2, the two high pressure reserve tanks 28a and 32a and the two low pressure reserve tanks 62a and 68a are provided with the respective valves: namely, the high pressure reserve tank 28a is connected with the high pressure reservoir valve 26 and the communication valve 501; the other high pressure reserve tank 32a is connected with the high pressure reservoir valve 30 and the communication valve 501; the low pressure reserve tank 62a is connected with the low pressure reservoir valve 502 and the communication valve 504; and the other low pressure reserve tank 68a is connected with the low pressure reservoir valve 506 and the communication valve 504. As a result, the pressure in those reserve tanks 28a, 32a, 62a and 68a can be individually controlled.

Despite of the embodiments thus far described, the present invention should not be limited thereto but can naturally be practiced in various modes without departing from its scope.

What is claimed is:

1. A fluid suspension system for a vehicle comprising:
    a fluid suspension having a fluid actuator;
    fluid supply/release means for supplying and releasing working fluid to and from the fluid actuator;
    inclination detection means for detecting an inclination of the vehicle; and
    inclination control means responsive to the inclination detection means for controlling the supply/release means such that a height-raising quantity for a lowered portion of the vehicle is less than a height-lowering quantity for a raised portion of the vehicle.

2. A fluid suspension system according to claim 1 wherein the supply/release means include a high pressure reserve tank and a low pressure reserve tank, and means for supplying working fluid from the high pressure reserve tank to the fluid actuator and releasing the working fluid from the fluid actuator to the low pressure reserve tank.

3. A fluid suspension system according to claim 1 wherein the inclination detection means include vehicle acceleration detection means for detecting a longitudinal and/or lateral vehicle accelerations.

4. A fluid suspension system according to claim 3 wherein the vehicle acceleration detection means detect an average longitudinal and/or lateral vehicle acceleration within an each first predetermined time period and for computing an acceleration difference between a maximum average one and a minimum average one within a second predetermined time period.

5. A fluid suspension system according to claim 4 wherein the inclination control means include means for computing an estimated longitudinal and/or lateral acceleration in response to the computed acceleration difference.

6. A fluid suspension system according to claim 5 wherein the inclination control means include means for computing the height-raising quantity and the height-lowering quantity in response to the estimated longitudinal and/or lateral acceleration.

7. A fluid suspension system according to claim 6 wherein the supply/release means include a high pressure reserve tank and a low pressure reserve tank, and the inclination control means include means for computing a variation in pressure due to fluid release from the high pressure reserve tank and a variation in pressure due to fluid absorption to the low pressure reserve tank in response to the computed height-raising and lowering quantity.

8. A fluid suspension system according to claim 7 wherein the inclination control means include means for controlling the supply/release means to actuate the fluid actuator in response to the variation in pressure due to fluid release from the high pressure reserve tank and the variation in pressure due to fluid absorption to the low pressure reserve tank.

9. A fluid suspension system according to claim 1 wherein the system further comprising:

vehicle speed detection means for detecting a vehicle speed;
lateral vehicle acceleration detection means for detecting a lateral acceleration of the vehicle;
braking detection means for detecting that the vehicle is braked;
steering angle detection means for detecting a steering angle of a steering; and
determination means of braking inclination control, responsive to the vehicle speed detection means, the lateral vehicle acceleration detection means, braking detection means and steering angle detection means, for determining whether or not a control over an inclination caused by braking is to start.

10. A fluid suspension system according to claim 1 wherein the system further comprising:
    throttle position detection means for detecting a throttle position of the vehicle;
    lateral acceleration detection means for detecting a lateral acceleration of the vehicle;
    steering angle detection means for detecting a steering angle of a steering; and
    determination means of acceleration inclination control, responsive to the throttle position detection means, the lateral acceleration detection means, braking detection means and steering angle detection means, for determining whether or not a control over an inclination caused by acceleration is to start.

11. A fluid suspension system according to claim 1 wherein the system further comprising:
    vehicle speed detection means for detecting a vehicle speed;
    longitudinal acceleration detection means for detecting a longitudinal acceleration of the vehicle;
    steering angle detection means for detecting a steering angle of a steering; and
    determination means of cornering inclination control, responsive to the vehicle speed detection means, the longitudinal acceleration detection means and steering angle detection means, for determining whether or not a control over an inclination caused by cornering is to start.

12. A fluid suspension system according to claim 1 wherein the system further comprising:
    actuation time period computing means for computing actuation time period of the fluid actuator; and
    fluid supply/release control means for supplying and releasing the working fluid to and from the fluid actuator in response to the actuation time period such that at least two of the actuators are simultaneously controlled.

13. A fluid suspension system according to claim 12 wherein the fluid supply/release control means include means for simultaneously terminating the fluid supply and release to and from the fluid actuator.

14. A fluid suspension system according to claim 13 wherein the supply/release control means include a high pressure reserve tank and a low pressure reserve tank, and include means for supplying the working fluid from the high pressure reserve tank to the fluid actuator in response to the actuation time periods of the fluid supply and for releasing the working fluid from the fluid actuator to the low pressure reserve tank in response to the actuation time periods of the fluid release.

* * * * *